US012627434B2

(12) United States Patent
Nigam et al.

(10) Patent No.: US 12,627,434 B2
(45) Date of Patent: May 12, 2026

(54) CROSS-PHASE TRACKING REFERENCE SIGNAL RATE MATCHING FOR MULTIPLE COORDINATED TRANSMIT RECEIVE POINTS WITH MULTIPLE DOWNLINK CONTROL INFORMATION

(71) Applicant: QUALCOMM Incorporated, San Diego, CA (US)

(72) Inventors: Gaurav Nigam, Millburn, NJ (US); Jae Ho Ryu, San Diego, CA (US); Mostafa Khoshnevisan, San Diego, CA (US); Jae Won Yoo, San Diego, CA (US); Manish Jain, San Jose, CA (US); Hari Sankar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 390 days.

(21) Appl. No.: 18/324,839

(22) Filed: May 26, 2023

(65) Prior Publication Data

US 2024/0396682 A1 Nov. 28, 2024

(51) Int. Cl.
*H04L 5/00* (2006.01)
*H04L 1/00* (2006.01)
*H04W 72/23* (2023.01)

(52) U.S. Cl.
CPC .......... *H04L 5/0048* (2013.01); *H04L 1/0067* (2013.01); *H04W 72/23* (2023.01)

(58) Field of Classification Search
CPC ... H04L 1/0003; H04L 1/0067; H04L 5/0044; H04L 5/0048; H04L 5/0051; H04W 72/23
See application file for complete search history.

(56) References Cited

U.S. PATENT DOCUMENTS

| | | | | |
|---|---|---|---|---|
| 10,873,389 B2 * | 12/2020 | Bai | ...................... | H04B 7/2603 |
| 11,108,613 B2 * | 8/2021 | Manolakos | ........... | H04L 27/261 |
| 11,128,428 B2 * | 9/2021 | Frenne | ..................... | H04B 7/08 |
| 11,641,299 B2 * | 5/2023 | Davydov | .............. | H04J 11/005 |
| | | | | 370/350 |
| 11,757,594 B2 * | 9/2023 | Frenne | ................. | H04L 5/0094 |
| | | | | 370/329 |

(Continued)

FOREIGN PATENT DOCUMENTS

| | | | | |
|---|---|---|---|---|
| CN | 112514311 A | * | 3/2021 | ............ H04W 72/23 |
| CN | 112514311 B | * | 4/2024 | ............ H04W 76/27 |

(Continued)

OTHER PUBLICATIONS

International Search Report and Written Opinion—PCT/US2024/026204—ISA/EPO—Jul. 15, 2024.

*Primary Examiner* — Eric Nowlin
(74) *Attorney, Agent, or Firm* — Harrity & Harrity, LLP

(57) ABSTRACT

Various aspects of the present disclosure generally relate to wireless communication. In some aspects, a first network node may receive second phase tracking reference signal (PTRS) configuration information for a second PTRS that is associated with a second network node. The first network node may transmit a physical downlink shared channel (PDSCH) that includes a first PTRS that is based at least in part on first PTRS configuration information, the PDSCH being based at least in part on cross-PTRS rate matching and the second PTRS configuration information. Numerous other aspects are described.

30 Claims, 11 Drawing Sheets

(56)                    References Cited

U.S. PATENT DOCUMENTS

| | | | | |
|---|---|---|---|---|
| 11,824,691 | B2 * | 11/2023 | Cheng | H04L 25/03821 |
| 11,824,803 | B2 * | 11/2023 | Cheng | H04L 5/0048 |
| 11,917,631 | B2 * | 2/2024 | Lee | H04W 72/23 |
| 12,335,080 | B2 * | 6/2025 | Davydov | H04L 27/2613 |
| 2018/0368013 | A1 * | 12/2018 | Yoo | H04L 5/0048 |
| 2019/0260466 | A1 * | 8/2019 | Bai | H04B 7/2603 |
| 2019/0296876 | A1 * | 9/2019 | Zhang | H04L 5/0048 |
| 2020/0052950 | A1 * | 2/2020 | Manolakos | H04L 5/0048 |
| 2020/0403748 | A1 | 12/2020 | Yokomakura | |
| 2021/0014021 | A1 * | 1/2021 | Hunukumbure | H04L 5/0053 |
| 2021/0076360 | A1 | 3/2021 | Davydov et al. | |
| 2021/0143964 | A1 * | 5/2021 | Frenne | H04W 72/23 |
| 2021/0168011 | A1 * | 6/2021 | Davydov | H04J 11/005 |
| 2021/0321447 | A1 * | 10/2021 | Lee | H04L 1/0013 |
| 2021/0385045 | A1 * | 12/2021 | Frenne | H04L 5/0048 |
| 2022/0311571 | A1 * | 9/2022 | Cheng | H04L 5/005 |
| 2022/0311647 | A1 * | 9/2022 | Cheng | H04L 27/2675 |
| 2023/0239188 | A1 * | 7/2023 | Davydov | H04L 1/0003 370/350 |
| 2024/0121052 | A1 * | 4/2024 | Frenne | H04L 5/0048 |
| 2024/0322977 | A1 * | 9/2024 | Frenne | H04L 5/0037 |

FOREIGN PATENT DOCUMENTS

| | | | | | |
|---|---|---|---|---|---|
| CN | 118054893 | A | * | 5/2024 | H04W 76/27 |
| EP | 3834334 | B1 | * | 11/2023 | H04W 76/27 |
| EP | 4277191 | A2 | * | 11/2023 | H04W 76/27 |
| WO | WO-2019160606 | A1 | * | 8/2019 | H04B 7/2668 |
| WO | WO-2020033198 | A1 | * | 2/2020 | H04L 27/261 |
| WO | WO-2020067623 | A1 | * | 4/2020 | H04L 1/00 |
| WO | WO-2021091449 | A1 | * | 5/2021 | H04L 5/0048 |
| WO | WO-2021093646 | A1 | * | 5/2021 | H04L 5/005 |

* cited by examiner

400

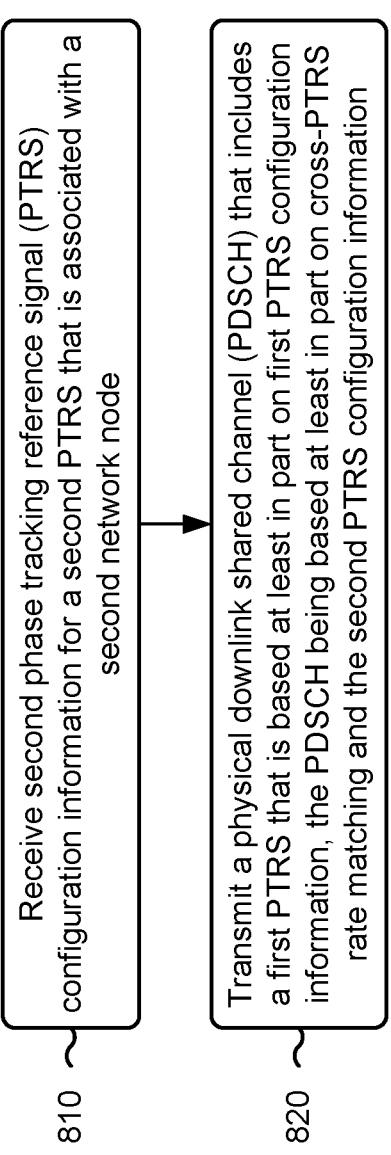

810 — Receive second phase tracking reference signal (PTRS) configuration information for a second PTRS that is associated with a second network node 820 — Transmit a physical downlink shared channel (PDSCH) that includes a first PTRS that is based at least in part on first PTRS configuration information, the PDSCH being based at least in part on cross-PTRS rate matching and the second PTRS configuration information

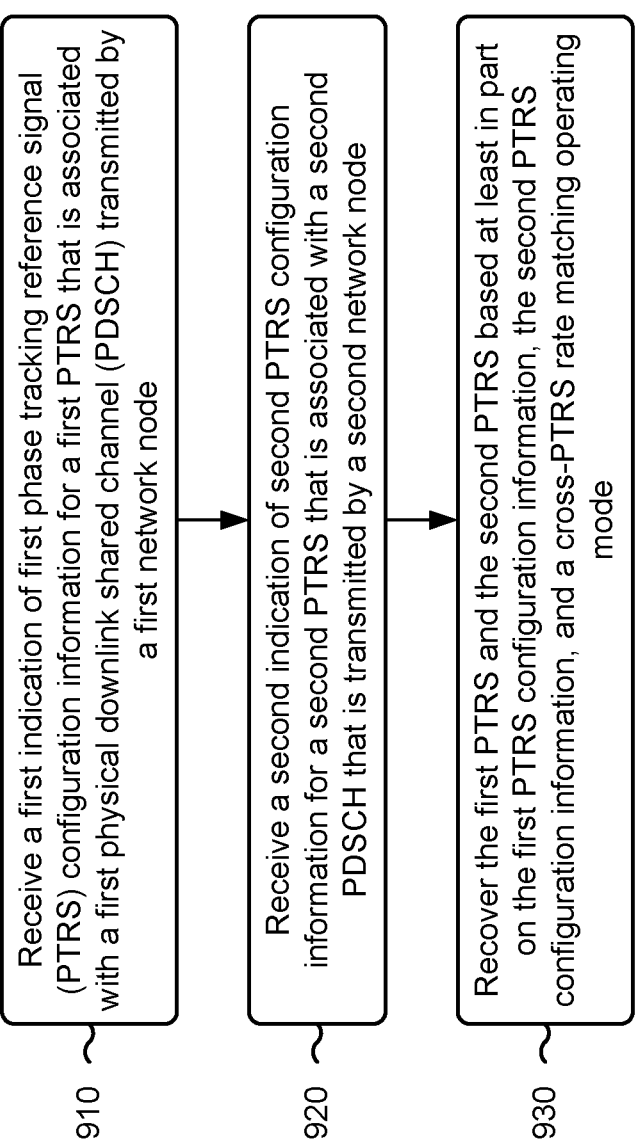

910 Receive a first indication of first phase tracking reference signal (PTRS) configuration information for a first PTRS that is associated with a first physical downlink shared channel (PDSCH) transmitted by a first network node 920 Receive a second indication of second PTRS configuration information for a second PTRS that is associated with a second PDSCH that is transmitted by a second network node 930 Recover the first PTRS and the second PTRS based at least in part on the first PTRS configuration information, the second PTRS configuration information, and a cross-PTRS rate matching operating mode

Reception Component 1102

Communication Manager 1106

Transmission Component 1104

1108

1

CROSS-PHASE TRACKING REFERENCE SIGNAL RATE MATCHING FOR MULTIPLE COORDINATED TRANSMIT RECEIVE POINTS WITH MULTIPLE DOWNLINK CONTROL INFORMATION

FIELD OF THE DISCLOSURE

Aspects of the present disclosure generally relate to wireless communication and to techniques and apparatuses for cross-phase tracking reference signal rate matching for multiple coordinated transmit receive points with multiple downlink control information.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first network node. The method may include receiving second phase tracking reference signal (PTRS) configuration information for a second PTRS that is associated with a second network node. The method may include transmitting a physical downlink shared channel (PDSCH) that includes a first PTRS that is based at least in part on first PTRS configuration information, the PDSCH being based at least in part on cross-PTRS rate matching and the second PTRS configuration information.

Some aspects described herein relate to a method of wireless communication performed by a user equipment (UE). The method may include receiving a first indication of first PTRS configuration information for a first PTRS that is associated with a first PDSCH transmitted by a first network node. The method may include receiving a second indication of second PTRS configuration information for a second PTRS that is associated with a second PDSCH that is transmitted by a second network node. The method may include recovering the first PTRS and the second PTRS based at least in part on the first PTRS configuration information, the second PTRS configuration information, and a cross-PTRS rate matching operating mode.

Some aspects described herein relate to an apparatus for wireless communication at a first network node. The apparatus may include one or more memories and one or more processors coupled to the one or more memories. The one or more processors may be configured to receive second PTRS configuration information for a second PTRS that is associated with a second network node. The one or more processors may be configured to transmit a PDSCH that includes a first PTRS that is based at least in part on first PTRS configuration information, the PDSCH being based at least in part on cross-PTRS rate matching and the second PTRS configuration information.

Some aspects described herein relate to an apparatus for wireless communication at a UE. The apparatus may include one or more memories and one or more processors coupled to the one or more memories. The one or more processors may be configured to receive a first indication of first PTRS configuration information for a first PTRS that is associated with a first PDSCH transmitted by a first network node. The one or more processors may be configured to receive a second indication of second PTRS configuration information for a second PTRS that is associated with a second PDSCH that is transmitted by a second network node. The one or more processors may be configured to recover the first PTRS and the second PTRS based at least in part on the first PTRS configuration information, the second PTRS configuration information, and a cross-PTRS rate matching operating mode.

Some aspects described herein relate to a non-transitory computer-readable medium that stores a set of instructions for wireless communication by a UE. The set of instructions, when executed by one or more processors of the UE, may cause the UE to receive a first indication of first PTRS configuration information for a first PTRS that is associated with a first PDSCH transmitted by a first network node. The set of instructions, when executed by one or more processors of the UE, may cause the UE to receive a second indication of second PTRS configuration information for a second PTRS that is associated with a second PDSCH that is transmitted by a second network node. The set of instructions, when executed by one or more processors of the UE, may cause the UE to recover the first PTRS and the second PTRS based at least in part on the first PTRS configuration information, the second PTRS configuration information, and a cross-PTRS rate matching operating mode.

Some aspects described herein relate to an apparatus for wireless communication. The apparatus may include means for receiving second PTRS configuration information for a second PTRS that is associated with a second network node. The apparatus may include means for transmitting a PDSCH that includes a first PTRS that is based at least in part on first PTRS configuration information, the PDSCH being based at least in part on cross-PTRS rate matching and the second PTRS configuration information.

Some aspects described herein relate to an apparatus for wireless communication. The apparatus may include means for receiving a first indication of first PTRS configuration information for a first PTRS that is associated with a first PDSCH transmitted by a first network node. The apparatus may include means for receiving a second indication of second PTRS configuration information for a second PTRS that is associated with a second PDSCH that is transmitted by a second network node. The apparatus may include means for recovering the first PTRS and the second PTRS based at least in part on the first PTRS configuration information, the second PTRS configuration information, and a cross-PTRS rate matching operating mode.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a diagram illustrating an example process performed, for example, by a first network node, in accordance with the present disclosure.

FIG. 9 is a diagram illustrating an example process performed, for example, by a UE, in accordance with the present disclosure.

DETAILED DESCRIPTION

Figure 1:
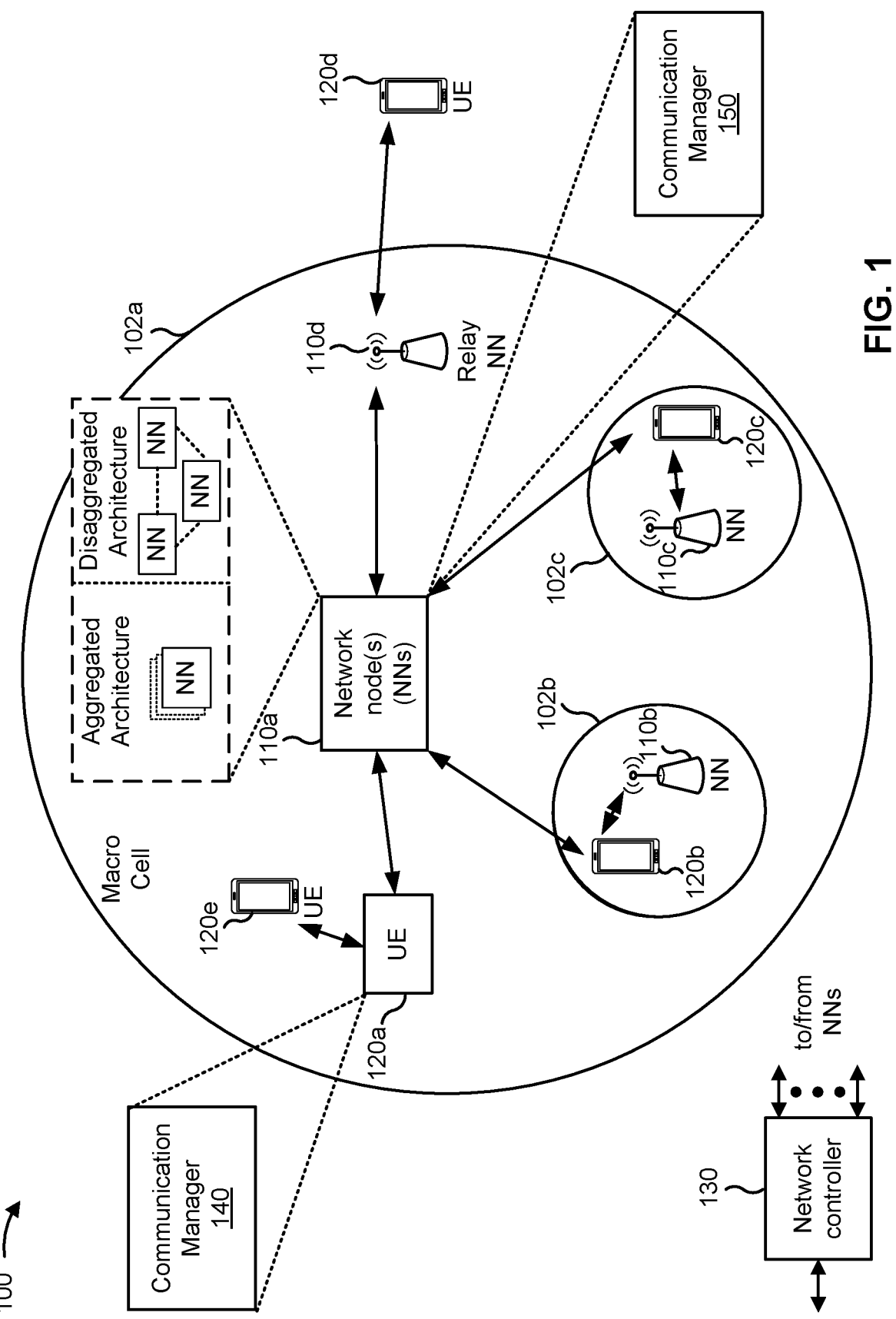
FIG. 1 is a diagram illustrating an example of a wireless network, in accordance with the present disclosure.

A phase tracking reference signal (PTRS) may carry information that is used by a device (e.g., a network node 110 and/or a user equipment (UE) 120) to compensate for oscillator phase noise. In some aspects, a network node may transmit a PTRS on a downlink channel, such as a physical downlink shared channel (PDSCH), and/or a UE may transmit a PTRS on an uplink channel, such as a physical uplink shared channel (PUSCH).

As described below, each transmit receive point (TRP) of multiple TRPs operating in Mode 2 for multiple TRP (multi-TRP) transmissions mode may transmit a respective physical downlink control channel (PDCCH) that schedules a respective PDSCH. For instance, a first TRP may transmit first downlink control information (DCI) via a first PDCCH that schedules a first PDSCH, and a second TRP may transmit second DCI via a second PDCCH that schedules a second PDSCH. In some aspects, one or more resources of the first PDSCH may overlap partially or fully with one or more resources of the second PDSCH. Fully overlapped transmissions and/or partially overlapped transmissions may distort PTRS transmissions and result in phase tracking errors at a UE and, subsequently, result in increased data recover errors, reduced data throughput, and/or increased data transfer latencies at the UE.

Various aspects described herein generally relate to cross-PTRS rate matching for multiple coordinated TRPs with multiple DCIs. Some aspects relate more specifically to network nodes performing PDSCH rate matching to avoid one or more resources associated with a PTRS transmission. In some aspects, a first network node may receive second PTRS configuration information for a second PTRS that is associated with a second network node. To illustrate, the second PTRS configuration information may specify and/or indicate a resource location of the second PTRS in a second PDSCH transmitted by (and/or scheduled to be transmitted by) the second network node. The first network node may transmit a first PTRS via a first PDSCH based at least in part on first PTRS configuration information (e.g., associated with the first TRP) and cross-PTRS rate matching that is based at least in part on the second PTRS configuration information. As one example, the first network node may apply rate matching to the first PDSCH based at least in part on the resource location of the second PTRS in the second PDSCH, and/or the first PDSCH overlapping with the second PDSCH in frequency and/or time.

By performing cross-PTRS rate matching, network nodes that are included in Mode 2 multi-TRP communications may avoid occupying overlapping resources that are associated with a PTRS transmission by another (coordinated) network node and mitigate distortion to the PTRS. Mitigating distortion to a PTRS may reduce phase tracking errors (e.g., phase error estimations associated with one network node or both network nodes) at a receiving device, reduce data recovery errors, increase data throughput, and/or reduce data transfer latencies.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120c), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a TRP, a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*c*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a network node (e.g., the network node 110) may include a communication manager 150. As described in more detail elsewhere herein, the communication manager 150 may receive second PTRS configuration information for a second PTRS that is associated with a second network node; and transmit a PDSCH that includes a first PTRS that is based at least in part on first PTRS configuration information, the PDSCH being based at least in part on cross-PTRS rate matching and the second PTRS configuration information. Additionally, or alternatively, the communication manager 150 may perform one or more other operations described herein.

In some aspects, a UE (e.g., the UE 120) may include a communication manager 140. As described in more detail elsewhere herein, the communication manager 140 may receive a first indication of first PTRS configuration information for a first PTRS that is associated with a first PDSCH transmitted by a first network node; receive a second indication of second PTRS configuration information for a second PTRS that is associated with a second PDSCH that is transmitted by a second network node; and recover the first PTRS and the second PTRS based at least in part on the first PTRS configuration information, the second PTRS configuration information, and a cross-PTRS rate matching operating mode. Additionally, or alternatively, the communication manager 140 may perform one or more other operations described herein.

As indicated above, FIG. 1 is provided as an example. Other examples may differ from what is described with regard to FIG. 1.

Figure 2:
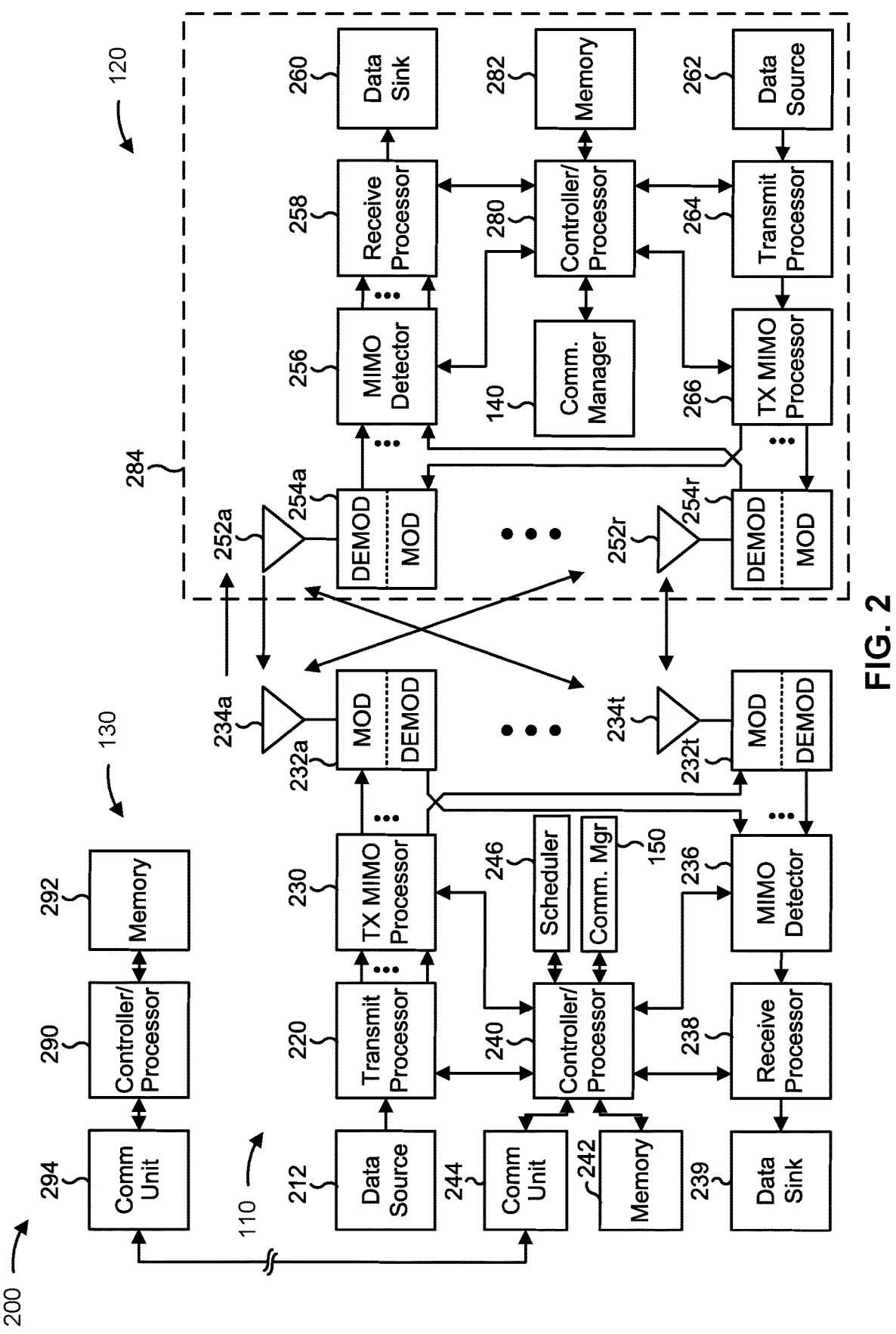
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-11).

The controller/processor 240 of the network node 110, the controller/processor 280 of the UE 120, and/or any other component(s) of FIG. 2 may perform one or more techniques associated with cross-PTRS rate matching for multiple TRPs with multiple DCI, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a network node (e.g., the network node 110) includes means for receiving second PTRS configuration information for a second PTRS that is associated with another network node; and/or means for transmitting a PDSCH that includes a first PTRS that is based at least in part on first PTRS configuration information, the PDSCH being based at least in part on cross-PTRS rate matching and the second PTRS configuration information. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a UE (e.g., the UE 120) includes means for receiving a first indication of first PTRS configuration information for a first PTRS that is associated with a first PDSCH transmitted by a first network node; means for receiving a second indication of second PTRS configuration information for a second PTRS that is associated with a second PDSCH that is transmitted by a second network node; and/or means for recovering the first PTRS and the second PTRS based at least in part on the first PTRS configuration information, the second PTRS configuration information, and a cross-PTRS rate matching operating mode. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
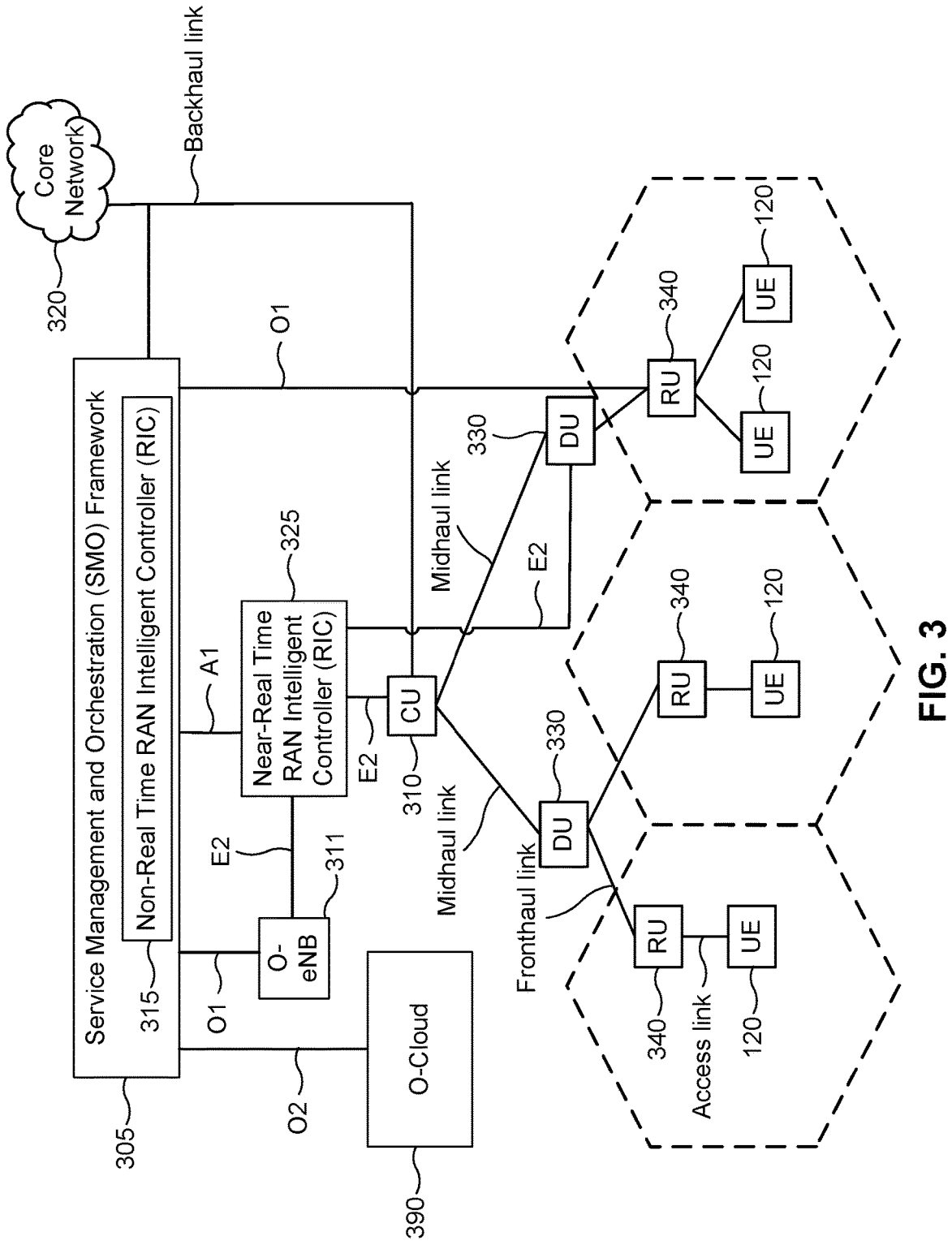
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
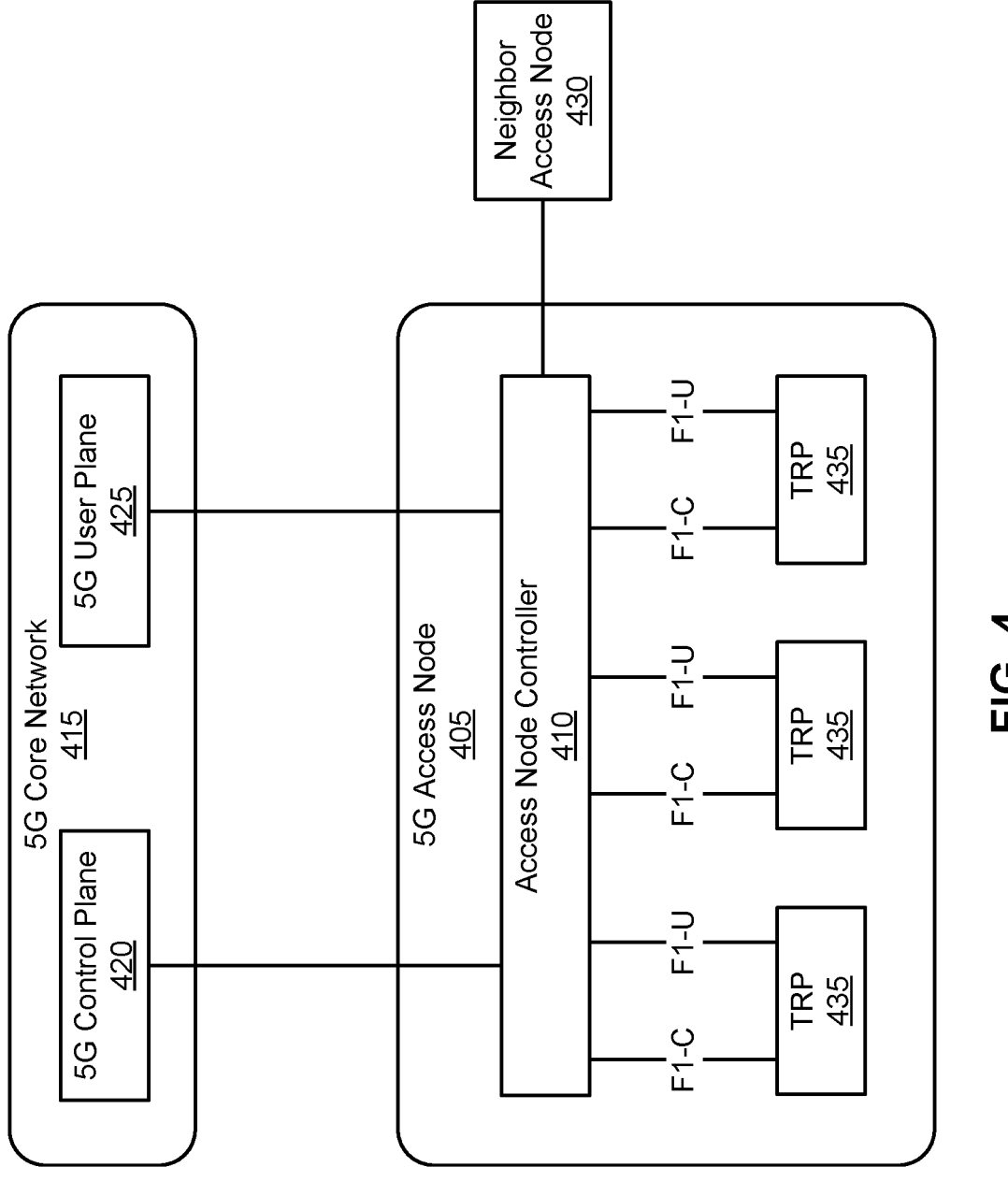
FIG. 4 illustrates an example logical architecture of a distributed radio access network in accordance with the present disclosure.

FIG. 4 illustrates an example logical architecture of a distributed RAN 400, in accordance with the present disclosure.

A 5G access node 405 may include an access node controller 410. The access node controller 410 may be a central unit (CU) of the distributed RAN 400. In some aspects, a backhaul interface to a 5G core network 415 may terminate at the access node controller 410. The 5G core network 415 may include a 5G control plane component 420 and a 5G user plane component 425 (e.g., a 5G gateway), and the backhaul interface for one or both of the 5G control plane and the 5G user plane may terminate at the access node controller 410. Additionally, or alternatively, a backhaul interface to one or more neighbor access nodes 430 (e.g., another 5G access node 405 and/or an LTE access node) may terminate at the access node controller 410.

The access node controller 410 may include and/or may communicate with one or more TRPs 435 (e.g., via an F1 Control (F1-C) interface and/or an F1 User (F1-U) interface). A TRP 435 may include a distributed unit (DU) and/or a radio unit (RU) of the distributed RAN 400. In some aspects, a TRP 435 may correspond to a network node 110 described above in connection with FIG. 1. For example, different TRPs 435 may be included in different network nodes 110. Additionally, or alternatively, multiple TRPs 435 may be included in a single network node 110. In some aspects, a network node 110 may include a CU (e.g., access node controller 410) and/or one or more DUs (e.g., one or more TRPs 435). In some cases, a TRP 435 may be referred to as a cell, a panel, an antenna array, or an array.

A TRP 435 may be connected to a single access node controller 410 or to multiple access node controllers 410. In some aspects, a dynamic configuration of split logical functions may be present within the architecture of distributed RAN 400, referred to elsewhere herein as a functional split. For example, a packet data convergence protocol (PDCP) layer, a radio link control (RLC) layer, and/or a MAC layer may be configured to terminate at the access node controller 410 or at a TRP 435.

In some aspects, multiple TRPs 435 may transmit communications (e.g., the same communication or different communications) in the same transmission time interval (TTI) (e.g., a slot, a mini-slot, a subframe, or a symbol) or different TTIs using different quasi co-location (QCL) relationships (e.g., different spatial parameters, different transmission configuration indicator (TCI) states, different precoding parameters, and/or different beamforming parameters). In some aspects, a TCI state may be used to indicate one or more QCL relationships. A TRP 435 may be configured to individually (e.g., using dynamic selection) or jointly (e.g., using joint transmission with one or more other TRPs 435) serve traffic to a UE 120.

As indicated above, FIG. 4 is provided as an example. Other examples may differ from what was described with regard to FIG. 4.

Figure 5:
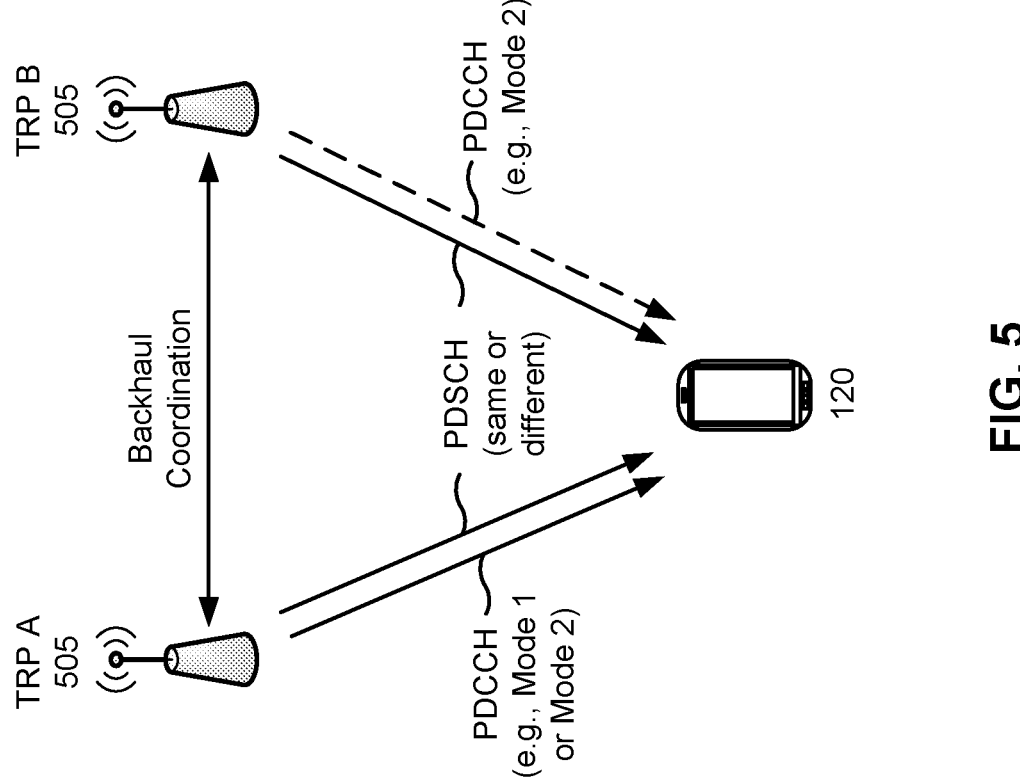
FIG. 5 is a diagram illustrating an example of multiple transmit receive point communication, in accordance with the present disclosure.
Figure 6:
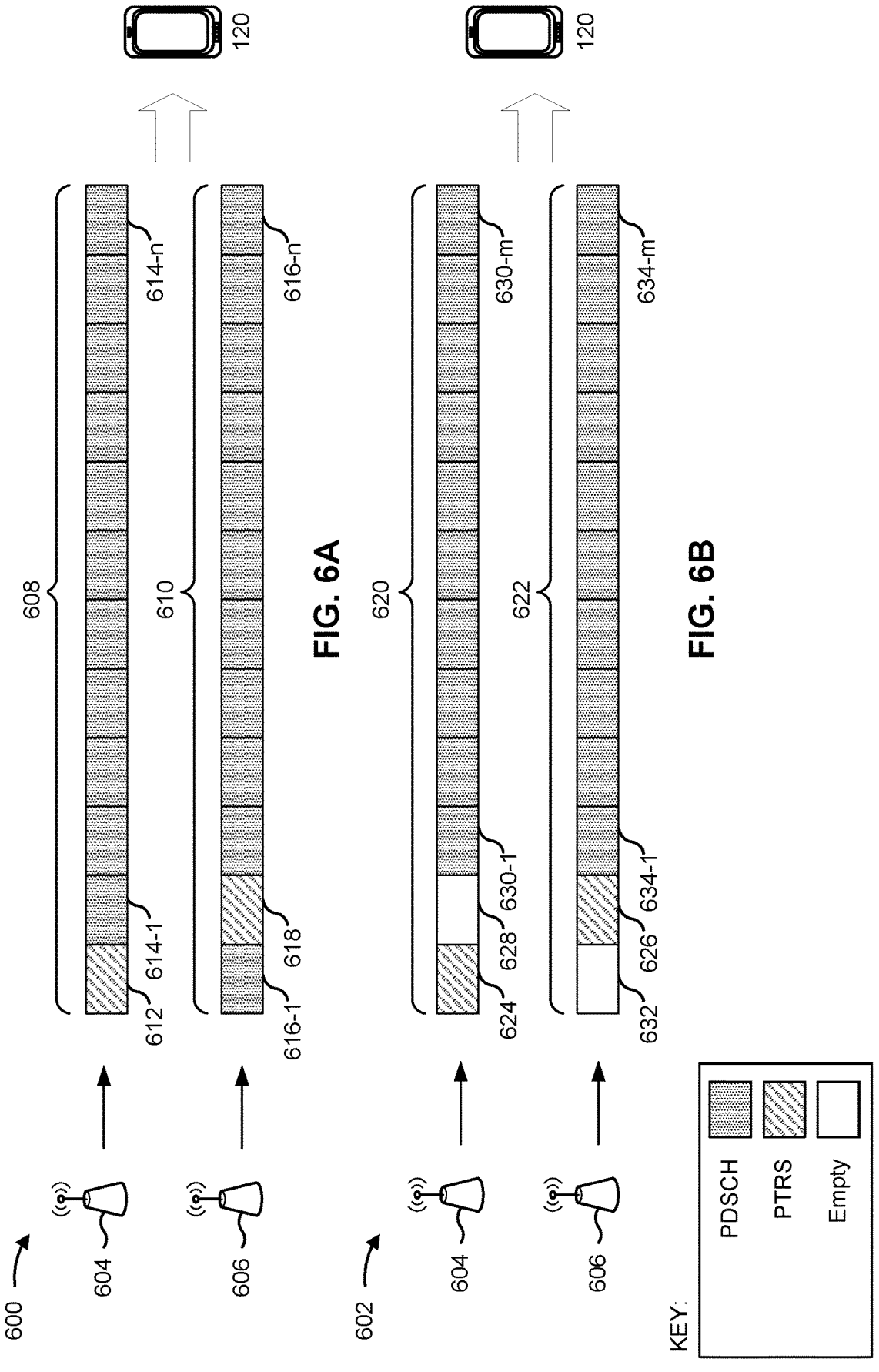
FIGS. 6A and 6B are diagrams illustrating a first example and a second example, respectively, of physical downlink shared channel transmissions, in accordance with the present disclosure.

FIG. 5 is a diagram illustrating an example 500 of multi-TRP communication (sometimes referred to as multi-panel communication), in accordance with the present disclosure. As shown in FIG. 5, multiple TRPs 505 may communicate with the same UE 120. A TRP 505 may correspond to a TRP 435 described above in connection with FIG. 4.

The multiple TRPs 505 (shown as TRP A and TRP B) may communicate with the same UE 120 in a coordinated manner (e.g., using coordinated multipoint transmissions) to improve reliability and/or increase throughput. The TRPs 505 may coordinate such communications via an interface between the TRPs 505 (e.g., a backhaul interface and/or an access node controller 410). The interface may have a smaller delay and/or higher capacity when the TRPs 505 are co-located at the same network node 110 (e.g., when the TRPs 505 are different antenna arrays or panels of the same network node 110), and may have a larger delay and/or lower capacity (as compared to co-location) when the TRPs 505 are located at different network nodes 110. The different TRPs 505 may communicate with the UE 120 using different QCL relationships (e.g., different TCI states), different demodulation reference signal (DMRS) ports, and/or different layers (e.g., of a multi-layer communication).

In a first multi-TRP transmission mode (e.g., Mode 1), a single PDCCH may be used to schedule downlink data communications for a single PDSCH. In this case, multiple TRPs 505 (e.g., TRP A and TRP B) may transmit communications to the UE 120 on the same PDSCH. For example, a communication may be transmitted using a single codeword with different spatial layers for different TRPs 505 (e.g., where one codeword maps to a first set of layers transmitted by a first TRP 505 and maps to a second set of layers transmitted by a second TRP 505). As another example, a communication may be transmitted using multiple codewords, where different codewords are transmitted by different TRPs 505 (e.g., using different sets of layers). In either case, different TRPs 505 may use different QCL relationships (e.g., different TCI states) for different DMRS ports corresponding to different layers. For example, a first TRP 505 may use a first QCL relationship or a first TCI state for a first set of DMRS ports corresponding to a first set of layers, and a second TRP 505 may use a second (different) QCL relationship or a second (different) TCI state for a second (different) set of DMRS ports corresponding to a second (different) set of layers. In some aspects, a TCI state in DCI (e.g., transmitted on the PDCCH, such as DCI format 1_0 or DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 505, and a second PDCCH may schedule a second codeword to be transmitted by a second TRP 505. Furthermore, first DCI (e.g., transmitted by the first TRP 505) may schedule a first PDSCH communication associated with a first set of DMRS ports with a first QCL relationship (e.g., indicated by a first TCI state) for the first TRP 505, and second DCI (e.g., transmitted by the second TRP 505) may schedule a second PDSCH communication associated with a second set of DMRS ports with a second QCL relationship (e.g., indicated by a second TCI state) for the second TRP 505. In this case, DCI (e.g., having DCI format 1_0 or DCI format 1_1) may indicate a corresponding TCI state for a TRP 505 corresponding to the DCI. The TCI field of a DCI indicates the corresponding TCI state (e.g., the TCI field of the first DCI indicates the first TCI state and the TCI field of the second DCI indicates the second TCI state).

A PTRS may carry information that is used by a device (e.g., a network node 110 and/or a UE 120) to compensate for oscillator phase noise. In some aspects, the phase noise of an oscillator may increase as the oscillator carrier frequency increases. Accordingly, a device may measure and/or analyze a PTRS at high carrier frequencies, such as millimeter wave frequencies, to mitigate the oscillator phase noise. To illustrate, the device may use the PTRS to track the phase of the local oscillator and to enable suppression of phase noise and common phase error (CPE). In some aspects, a network node may transmit a PTRS on a downlink channel (e.g., on the PDSCH) and/or a UE may transmit a PTRS on an uplink channel (e.g., on the PUSCH). Accordingly, the PTRS may occupy and/or be assigned resources associated with the PDSCH and/or the PUSCH.

As described above, multiple TRPs operating in Mode 2 for multi-TRP transmissions mode may each transmit a respective PDCCH that schedules a respective PDSCH. For instance, a first TRP may transmit first DCI via a first PDCCH that schedules a first PDSCH, and a second TRP may transmit second DCI via a second PDCCH that schedules a second PDSCH. Accordingly, with regard to a downlink PTRS, the first TRP may transmit a first PTRS via the first PDSCH and the second TRP may transmit a second PTRS via the second PDSCH. In some aspects, one or more resources of the first PDSCH may overlap partially or fully with one or more resources of the second PDSCH. That is, the first PDSCH and the second PDSCH may use a same time span and/or a same frequency span for respective downlink transmissions, such as downlink transmissions that are directed to a UE that includes support for recovering data from overlapped transmissions.

Fully overlapped transmissions and/or partially overlapped transmissions may result in decreased performance (e.g., increased data recover errors, reduced data throughput, and/or increased data transfer latencies) at a device. To illustrate, based at least in part on transmitting Mode 2 multi-TRP communications, a first TRP may transmit a first PTRS via a first PDSCH, and a second TRP may transmit a second PTRS via a second PDSCH. For PDSCHs with overlapping resources (e.g., the first PDSCH and the second PDSCH utilizing one or more of the same resources), the overlapping may distort PTRS transmissions and result in phase tracking errors (e.g., for one or both TRPs). To illustrate, a transmission of the first PDSCH by the first TRP in a resource that includes the second PTRS transmitted by the second TRP may distort the second PTRS, increase a phase tracking error at the UE and, subsequently, result in increased data recover errors, reduced data throughput, and/or increased data transfer latencies at the UE.

Some techniques and apparatuses described herein provide cross-PTRS rate matching for multiple coordinated TRPs with multiple DCIs. In some aspects, a first network node may receive second PTRS configuration information for a second PTRS that is associated with a second network node. As one example, the first network node (e.g., a first TRP) may receive the second PTRS configuration information from the second network node (e.g., a second TRP) via a backhaul. As another example, the first network node may receive the second PTRS configuration information from a master network node and/or a controlling network node that is coordinating communications (e.g., multi-TRP communications) for the first TRP and the second TRP. The first network node may transmit a first PTRS via a first PDSCH based at least in part on first PTRS configuration information and cross-PTRS rate matching that is based at least in part on the second PTRS configuration information. To illustrate, the first network node may apply rate matching to the first PDSCH based at least in part on a location of the second PTRS in the second PDSCH and/or the first PDSCH overlapping with the second PDSCH in frequency and/or time (e.g., partially or fully).

"Rate matching" may denote a process in which a number of output bits (e.g., source bits for transmission) is adapted to match a number of transmission bits that may be transmitted for a given allocation. Rate matching may involve various techniques, such as increasing the number of output bits through repetition and/or decreasing the number of output bits through puncturing and/or shortening. "Cross-PTRS rate matching" may denote performing rate matching on user data for a first PDSCH transmission that includes a first PTRS, based at least on part on a location of a second PTRS in a second PDSCH transmission that has one or more overlapping resources with the first PDSCH transmission. To illustrate, a first network node may apply rate matching to a first PDSCH that is associated with a first PTRS to avoid one or more resources (e.g., one or more overlapping resources) that are associated with a second PTRS that is transmitted by a second network node. Alternatively, or additionally, the second network node may apply rate matching to a second PDSCH that is associated with transmitting the second PTRS to avoid one or more resources (e.g., one or more overlapping resources) that are associated with the first PTRS. That is, the first network node and/or the second network node may apply rate matching to data carried by the PDSCH to avoid resources associated with a PTRS transmission by another network node. By performing cross-PTRS rate matching, network nodes that are included in Mode 2 multi-TRP communications may avoid occupying overlapping resources that are associated with a PTRS transmission by another (coordinated) network node and mitigate distortion to the PTRS. Mitigating distortion to a PTRS may reduce phase tracking errors (e.g., phase error estimations associated with one TRP or both TRPs) at a receiving device, reduce data recovery errors, increase data throughput, and/or reduce data transfer latencies.

As indicated above, FIG. 5 is provided as an example. Other examples may differ from what is described with respect to FIG. 5.

FIGS. 6A and 6B are diagrams illustrating a first example 600 and a second example 602, respectively, of PDSCH transmissions, in accordance with the present disclosure.

FIG. 6A shows a first example 600 of a first network node 604 (e.g., a first TRP) and a second network node 606 (e.g., a second TRP) that communicate with a UE 120 based at least in part on using Mode 2 communications as described with regard to FIG. 5. For instance, the first network node 604 may transmit a first PDSCH 608 and the second network node 606 may transmit a second PDSCH 610. In some aspects, the first network node 604 may indicate resource allocation for the first PDSCH 608 via a first DCI, and the second network node 606 may indicate resource allocation for the second PDSCH 610 via a second DCI. Each partition of the first PDSCH 608 and/or the second PDSCH shown in the example 600 may represent a resource element (RE). To illustrate, a PDSCH may be allocated based at least in part on a resource block (RB), and each RB may have 12 REs per symbol. However, in other examples, each partition may represent other groupings and/or units of resources. In some aspects, the first PDSCH 608 and the second PDSCH 610 may include one or more resources that overlap.

In the example 600, the first PDSCH 608 includes a PTRS in partition 612 that is shown with a diagonal pattern, and user data in multiple additional partitions of the PDSCH

608, shown as partition 614-1 up to an n-th partition 614-$n$ that include a dotted pattern, where n is an integer. The second PDSCH 610 also includes user data in multiple partitions, shown as partition 616-1 up to n-th partition 616-$n$ that include a dotted pattern, and a PTRS in partition 618 that includes a diagonal pattern. Accordingly, n partitions of the first PDSCH 608 and n partitions of the PDSCH 610 include user data, and one partition of each PDSCH includes a respective PTRS. A location of a PTRS in the PDSCH (e.g., the partition 612 in the first PDSCH 608 and/or the partition 618 in the second PDSCH 610) may be based at least in part on one or more configuration parameters. To illustrate, the PTRS location may be associated with an RE offset within an RB that may be based at least in part on a DMRS port (e.g., used to transmit the PTRS), a time-domain density configuration that may be based at least in part on a scheduled MCS, and/or a frequency-domain density configuration that may be based at least in part on an RB allocation and/or a scheduled bandwidth.

As described above, one or more resources of the PDSCH 608 may overlap with one or more resources of the PDSCH 610. For instance, the partition 612 of the PDSCH 608 may overlap in frequency and/or time with the partition 616-1 of the PDSCH 610. Based at least in part on the overlap, user data transmitted via the PDSCH 610 based at least in part on the partition 616-1 may distort the first PTRS transmitted via the PDSCH 608 based at least in part on the partition 612. Alternatively, or additionally, user data transmitted via the PDSCH 608 based at least in part on the partition 614-1 may overlap with the partition 618 of the PDSCH 610 and result in distortion to the second PTRS.

FIG. 6B shows a second example 602 of the first network node 604 and the second network node 606 communicating with the UE 120 based at least in part on Mode 2 multi-TRP communications and cross-PTRS rate matching. To illustrate, in a similar manner as described with regard to the first example 600, the first network node 604 and the second network node 606 may transmit a third PDSCH 620 and a fourth PDSCH 622, respectively, that include one or more overlapping resources. That is, the resources of the third PDSCH 620 may partially overlap and/or fully overlap with the resources of the fourth PDSCH 622. The first network node 604 may transmit a PTRS in partition 624 (shown with a diagonal pattern) of the third PDSCH 620, and the second network node 606 may transmit a PTRS in partition 626 (shown with a diagonal pattern) in the fourth PDSCH 622.

In some aspects, the first network node 604 may perform cross-PTRS rate matching on user data based at least on the second network node 606 transmitting a PTRS in the partition 626. For instance, the first network node 604 may identify a location of a partition in the fourth PDSCH 622 that carries a PTRS (e.g., the partition 626). Alternatively, or additionally, the first network node 604 may identify that the partition 626 of the fourth PDSCH 622 overlaps with partition 628 (shown in solid white) of the third PDSCH 620. Accordingly, the first network node 604 may perform cross-PTRS rate matching to avoid transmitting user data in the partition 628 of the third PDSCH 620 and/or to rate match the user data to partition 630-1 up to partition 630-$m$, where m is an integer that is less than n. Alternatively, or additionally, the second network node 606 may identify that partition 632 (shown in solid white) of the fourth PDSCH 622 overlaps with a partition of the third PDSCH 620 that is assigned to a PTRS (e.g., the partition 624). Accordingly, the second network node 606 may perform cross-PTRS rate matching to avoid transmitting user data in the partition 632 and/or to rate match the user data to partition 634-1 up to partition 634-$m$.

Performing cross-PTRS rate matching may enable a network node (e.g., the first network node 604 and/or the second network node 606) that is transmitting in a coordinated manner with another network node to avoid occupying overlapping resources that are assigned to a PTRS and, subsequently, mitigate distortion to the PTRS (e.g., as observed by a UE). Mitigating distortion to a PTRS may reduce phase tracking errors at a device (e.g., the UE), reduce data recovery errors, increase data throughput, and/or reduce data transfer latencies.

As indicated above, FIGS. 6A and 6B are provided as examples. Other examples may differ from what is described with regard to FIGS. 6A and 6B.

Figure 7:
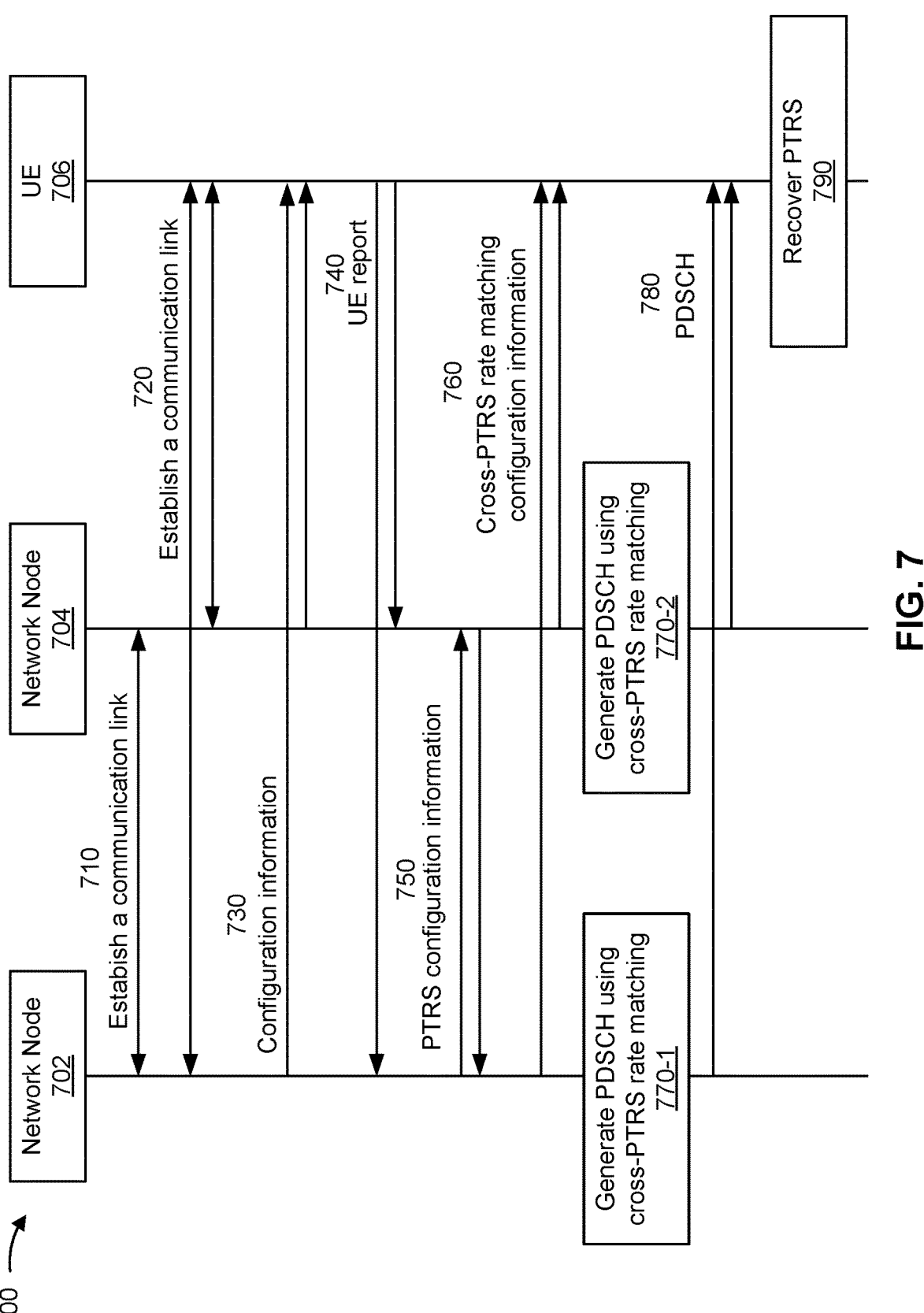
FIG. 7 is a diagram illustrating an example of a wireless communication process between a first network node, a second network node, and a UE, in accordance with the present disclosure.

FIG. 7 is a diagram illustrating an example 700 of a wireless communication process between a first network node 702 (e.g., a first network node 110, a first TRP 435, and/or a first TRP 505), a second network node 704 (e.g., a second network node 110, a second TRP 435, and/or a second TRP 505), and a UE 706 (e.g., a UE 120), in accordance with the present disclosure.

As shown by reference number 710, a first network node 702 may establish a communication link with a second network node 704. As one example, the first network node 702 and the second network node 704 may establish a backhaul link with one another, such as a wired backhaul link and/or a wireless backhaul link. Alternatively, or additionally, the first network node 702 and the second network node 704 may establish an indirect communication link with one another, such as by way of a managing network node (e.g., a base station, an access node controller 410, and/or a core network 415) that coordinates communications between the first network node 702 and the second network node 704. For instance, the first network node 702 may communicate with the second network node 704 indirectly based at least in part on transmitting information (e.g., a request, a response, and/or a configuration parameter) to the managing network node, and the managing network node forwarding an indication of the information to the second network node 704 (or vice versa).

As shown by reference number 720, the first network node 702 and/or the second network node 704 may establish a communication link with a UE 706. In some aspects, the first network node 702 and the second network node 704 may establish respective communication links with the UE 706, such as communication link(s) associated with Mode 2 multi-TRP communications as described with regard to FIG. 5. As one example, the first network node 702 may establish a first communication link with the UE 706 that is based at least in part on a first PDCCH and/or a first PDSCH, and the second network node 704 may establish a second communication link with the UE 706 that is based at least in part on a second PDCCH and/or a second PDSCH.

Based at least in part on establishing the communication link(s) with the first network node 702 and the second network node 704, the UE 706 may transmit information to the network node(s) and/or receive information from the network node(s). For example, the UE 706 may transmit information that indicates that the UE supports cross-PTRS rate matching. Examples of a UE supporting cross-PTRS rate matching may include the UE recovering a cross-PTRS rate matching message, transmitting a cross-PTRS rate matching message, recovering user data that is included in a PDSCH that is based at least in part on cross-PTRS rate matching, and/or recovering a PTRS that is included in the PDSCH. In some aspects, the UE may indicate support for cross-PTRS rate matching in UE capability information that is transmitted to the first network node 702 and/or the second network node 704. Alternatively, or additionally, the UE may indicate support for cross-PTRS rate matching in Layer 1 signaling (e.g., uplink control information (UCI)), Layer 2 signaling (e.g., a MAC control element (CE)), and/or Layer 3 signaling (e.g., RRC signaling).

As shown by reference number 730, the first network node 702 may transmit, and the UE 706 may receive, a first indication of configuration information. Alternatively, or additionally, the second network node 704 may transmit, and UE 706 may receive, a second indication of configuration information. In some aspects, the configuration information from the first network node 702 and/or the second network node 704 may include configuration information that is associated with cross-PTRS rate matching, such as a measurement reporting configuration and/or a mapping table configuration as described below. For visual clarity, FIG. 7 shows the first network node 702 and the second network node 704 indicating the respective cross-PTRS rate matching configuration information as a single respective signaling transaction, but various aspects may include multiple signaling transactions from a network node to the UE 706 and/or vice versa.

As one example, the first network node 702 and/or the second network node 704 may transmit one or more RRC messages to the UE 706 that configure one or mapping tables that are associated with cross-PTRS rate matching. To illustrate, a mapping table may map and/or associate a DMRS port to a relative RE offset that is associated with a PTRS. In some aspects, a relative RE offset specifies a differential offset between a first location of a first PTRS in a first PDSCH and a second location of a second PTRS in a second PDSCH. Accordingly, a device may derive and/or calculate the second location based at least in part on using the first location and the differential offset (e.g., the relative RE offset). A first example mapping table indicated by the first network node 702 and/or the second network node 704 may include a mapping table that indicates multiple potential relative RE offsets for each DMRS port included in the table. To illustrate, the first example mapping table may specify two potential relative RE offsets that are associated with DMRS port 0, two potential relative RE offsets that are associated with DMRS port 1, two potential relative RE offsets that are associated with DMRS port 2, and/or two potential relative RE offsets that are associated with DMRS port 3. The first network node 702 and/or the second network node 704 may subsequently select one of the two potential relative RE offsets associated with a DMRS port via another mechanism, such as through a DCI field as described with regard to reference number 760. A second example mapping table indicated by the first network node 702 and/or the second network node 704 may be a mapping table that indicates a single relative RE offset for each DMRS port. Although a network node may configure a mapping table that is associated with cross-PTRS rate matching (e.g., via RRC messaging or other messaging), other examples may include a communication standard specifying a mapping table (e.g., entries and/or values in the mapping table).

In some aspects, the first network node 702 and/or the second network node 704 may indicate one or more measurement reporting configurations that are associated with cross-PTRS rate matching, such as a channel state information (CSI) reporting configuration and/or a Layer 1 measurement reporting configuration (e.g., a Layer 1 RSRP measurement reporting configuration). That is, the first network node 702 and/or the second network node 704 may configure the UE 706 to generate and/or return a measurement report that indicates cross-PTRS rate matching information. For instance, the first network node 702 and/or the second network node 704 may configure the UE 706 to report a cross-PTRS rate matching metric and/or an occurrence of a cross-PTRS rate matching condition. Some non-limiting examples of a cross-PTRS rate matching metric may include a correlation metric associated with the first network node and the second network node, a PDSCH rank supported by the UE 706, and/or an MCS supported by the UE 706 for a current channel condition. A correlation metric may indicate an orthogonality between two beams (e.g., a first beam transmitted by a first network node and a second beam transmitted by a second network node), a PDSCH rank supported by the UE may indicate a number of PDSCH transmission layers supported by the UE (e.g., for current channel conditions), and/or an MCS indicated by the UE may indicate a maximum MCS supported by the UE (e.g., for current channel conditions). Some non-limiting examples of a cross-PTRS rate matching condition may include the UE 706 detecting that the correlation metric satisfies and/or fails to satisfy a first threshold, the UE 706 detecting that the PDSCH rank satisfies and/or fails to satisfy a second threshold, and/or the UE 706 detecting that an MCS satisfies and/or fails to satisfy a third threshold. In some aspects, the occurrence of a cross-PTRS rate matching condition may be associated with enabling and/or disabling cross-PTRS rate matching. For instance, a correlation metric that satisfies the first threshold may indicate to enable cross-PTRS rate matching, and/or a PDSCH rank failing to satisfy the second threshold may indicate to disable cross-PTRS rate matching. As part of configuring the UE to report cross-PTRS rate matching information, the first network node 702 and/or the second network node 704 may indicate a selection of a particular cross-PTRS rate matching metric, a selection of a particular cross-PTRS rate matching condition, and/or a threshold value that is associated with the cross-PTRS rate matching condition.

As shown by reference number 740, the UE 706 may transmit, and the first network node 702 and/or the second network node 704 may receive, a UE report. Some non-limiting examples of a UE report may include a CSI report and/or a Layer 1 RSRP report, such as a multiple TRP CSI report and/or a multiple TRP Layer 1 RSRP report. For group-based reporting (e.g., a multiple TRP CSI report and/or a multiple TRP Layer 1 RSRP report, the UE 706 may report per beam-pair results (e.g., a respective result for each beam pair). The UE 706 may transmit the UE report based at least in part on a variety of trigger events, such as detecting the occurrence of a cross-PTRS operating condition and/or a reporting time configuration indicated by a measurement reporting configuration (e.g., a periodic reporting time configuration and/or an aperiodic reporting time configuration). In some aspects, the UE report may indicate the occurrence of a cross-PTRS rate matching condition and/or specify the cross-PTRS rate matching condition (e.g., singular and/or per-beam pair). Alternatively, or additionally, the UE report may indicate a cross-PTRS rate matching metric (e.g., a single metric and/or a respective per-beam pair metric), such as a correlation metric between the first network node 702 and the second network node 704, a PDSCH transmission rank (e.g., supported by the UE 706), and/or an MCS supported by the UE.

In some aspects, the UE 706 may transmit, in the UE report, a UE-selected cross-PTRS rate matching operating mode (e.g., enabled or disabled). For example, the UE may transmit an enabled state as the UE-selected cross-PTRS rate matching operating mode based at least in part on detecting a first cross-PTRS rate matching condition, and/or may transmit a disabled state as the UE-selected cross-PTRS rate matching operating mode based at least in part on detecting a second cross-PTRS rate matching condition. Alternatively, or additionally, the UE 706 may calculate the UE-selected cross-PTRS rate matching operating mode based at least in part on calculating whether a cross-PTRS rate matching metric satisfies a cross-PTRS rate matching threshold and/or fails to satisfy the cross-PTRS rate matching threshold.

Based at least in part on receiving the UE report, the first network node 702 and/or the second network node 704 may select and/or set an operating mode of the cross-PTRS rate matching (e.g., an enabled state or a disabled state). As one example, the UE report may indicate the occurrence of a first cross-PTRS rate matching condition associated with enabling cross-PTRS rate matching and/or a second cross-PTRS rate matching condition associated with disabling cross-PTRS rate matching. As another example, the UE report may indicate a cross-PTRS rate matching metric, and the first network node 702 and/or the second network node 704 may calculate whether the cross-PTRS rate matching metric satisfies a cross-PTRS rate matching threshold and/or fails to satisfy the cross-PTRS rate matching threshold. Satisfying the cross-PTRS rate matching threshold may indicate to enable or disable cross-PTRS rate matching. Accordingly, the first network node 702 and/or the second network node 704 may select an operating mode (e.g., an enabled state and/or a disabled state) for cross-PTRS rate matching based at least in part on a cross-PTRS rate matching metric and a cross-PTRS rate matching threshold. Examples of a cross-PTRS rate matching threshold may include a correlation threshold, a PDSCH rank threshold, and/or an MCS threshold.

As shown by reference number 750, the first network node 702 may transmit, and the second network node 704 may receive, first PTRS configuration information. Alternatively, or additionally, the second network node 704 may transmit, and the first network node 702 may receive, second PTRS configuration information. In some aspects, the first network node 702 and/or the second network node 704 may transmit respective PTRS configuration information to the other network node using a backhaul link. That is, the first network node 702 and/or the second network node 704 may transmit the respective PTRS configuration information via the backhaul link. Alternatively, or additionally, the first network node 702 and/or the second network node 704 may indicate the respective PTRS configuration information to the other network node indirectly and through a managing network node (e.g., a base station, an access node controller 410, and/or a core network 415). The PTRS configuration information may indicate a configuration of a PTRS, such as an RE offset within an RB, a DMRS port, a time-domain density, an MCS, a frequency-domain density, and/or an RB allocation that may be used by a wireless communication device (e.g., a network node 110 and/or a UE 120) to derive a transmission location of the PTRS (e.g., a resource element, a time span, and/or frequency span) in a PDSCH transmission.

As shown by reference number 760, the first network node 702 and/or the second network node 704 may transmit, and the UE 706 may receive, a first indication of first cross-PTRS rate matching configuration information. In some aspects, the first cross-PTRS rate matching configuration information may include at least part of the first PTRS configuration information that is associated with the first PTRS and/or at least part of the second PTRS configuration information. Alternatively, or additionally, the second network node 704 may transmit, and UE 706 may receive, a second indication of second cross-PTRS rate matching configuration information that may include at least part of the second PTRS configuration information associated with the second PTRS and/or at least part of the first PTRS configuration information associated with the first PTRS. The first network node 702 and/or the second network node 704 may transmit the respective cross-PTRS rate matching configuration information in and/or using any combination of Layer 1 signaling (e.g., DCI), Layer 2 signaling (e.g., a MAC CE), and/or Layer 3 signaling (e.g., RRC signaling).

As one example, the UE 706 may receive, as at least part of the cross-PTRS rate matching information, first DCI from the first network node 702 that indicates the first PTRS configuration information for the first PTRS and second DCI from the second network node 704 that indicates the second PTRS configuration information for the second PTRS. That is, each network node may indicate respective PTRS configuration information to the UE 706 (e.g., without indicating PTRS configuration for the other network node). Based at least in part on decoding the first DCI and a second DCI, the UE 706 may derive any combination of an RB allocation, an MCS, and/or a DMRS port configuration for each network node and, subsequently, derive one or more PTRS resource location(s) associated with cross-PTRS rate matching (e.g., respective PDSCH rate matching) performed by each network node.

Alternatively, or additionally, the first DCI from the first network node 702 may indicate at least part of the second PTRS configuration information (e.g., location information) associated with the second PTRS, and/or the second DCI from the second network node 704 may indicate at least part of the first PTRS configuration information associated with the first PTRS. Having a network node indicate PTRS configuration information for multiple PTRSs associated with a Mode 2 multi-TRP communication may mitigate recovery errors at the UE 706 in the event the UE 706 fails to receive and/or recover one of the DCIs. That is, the UE 706 may receive sufficient information in a single DCI to recover the multiple PTRSs and/or user data from each PDSCH.

In some aspects, the first DCI and/or the second DCI may include, respectively, a single bit field that indicates a cross-PTRS rate matching operating mode. To illustrate, a network node (e.g., the first network node 702 and/or the second network node 704) may set the single bit field to a value that indicates a cross-PTRS rate matching operating mode, such as a first value (e.g., "1" or "0") that indicates that cross-PTRS rate matching has an enabled state and/or a second value (e.g., "0" or "1", respectively) that indicates that cross-PTRS rate matching has a disabled state. Alternatively, or additionally, the single bit field may indicate (e.g., via the first value and/or the second value) whether the first PDSCH and the second PDSCH are assigned fully overlapping resources (e.g., the resource allocation and/or REs assigned to the first PDSCH fully overlaps with the resource allocation an/or REs assigned to the second PDSCH in both frequency and time).

A network node may determine the operating mode based at least in part on a variety of factors. For instance, the network node may determine the operating mode based at least in part on the UE report as described with regard to reference number 740. Alternatively, or additionally, the network node may calculate that a first resource associated with the first PTRS and/or first PDSCH overlaps with a second resource associated with the second PTRS and/or the second PDSCH based at least in part on using the first PTRS configuration information and the second PTRS configuration information indicated as described with regard to reference number 750. Accordingly, the network node may select an enabled state for the cross-PTRS rate matching operating mode based at least in part on calculating that the first PTRS and the second PTRS are associated with overlapping PDSCHs (e.g., either partially overlapping or fully overlapping).

Alternatively, or additionally, the DCI (e.g., the first DCI transmitted by the first network node 702 and/or the second network node 704) may include a PTRS resource field that is associated with a PTRS that is associated with a coordinated network node (e.g., the second network node 704 and/or the first network node 702, respectively). In some aspects, the PTRS resource field may indicate at least part of the PTRS configuration information of the PTRS transmitted by the coordinated network node. To illustrate, the PTRS resource field of the first DCI transmitted by the first network node 702 may indicate a time-domain density associated with the second PTRS and/or an RE offset associated with the second PTRS (and/or vice versa for the second DCI transmitted by the second network node 704 and the first PTRS). The RE offset may be a relative RE offset that indicates a differential location of the other PTRS. For example, the first PTRS transmitted by the first network node 702 may be associated with a DMRS port, and the DMRS port may be associated with a nominal RE offset. The relative RE offset indicated in the PTRS resource field for the second PTRS may be a relative RE offset that is based at least in part on the nominal RE offset.

In some aspects, a network node may indicate, in the PTRS resource field, a time-domain density of the PTRS associated with the coordinated network node. In some aspects, the time-domain density indicated in the PTRS resource field may be based at least in part on an MCS threshold and/or a relationship between a time-domain density associated with the first PTRS and the second PTRS. For instance, the PTRS resource field may indicate whether a time-domain density of the PTRS satisfies the MCS threshold or fails to satisfy the MCS threshold, such as by setting a single bit in the PTRS resource field to a first value (e.g., "1") that indicates that the MCS threshold has been satisfied or a second value (e.g., "0") that indicates that the MCS threshold has not been satisfied. The network node may transmit an indication of the MCS threshold to the UE 706 (e.g., separately from the PTRS resource field) using any combination of Layer 1 signaling, Layer 2, signaling, and/or Layer 3 signaling. For example, a value of the MCS threshold may be RRC configured. Alternatively, or additionally, the PTRS resource field may indicate that a time-domain density relationship between the first PTRS and the second PTRS exists and/or a configuration of the time-domain density relationship (e.g., a same time-domain density configuration and/or a ratio). In some aspects, the network node may transmit an indication of a configuration for the time-domain density relationship in Layer 1 signaling, Layer 2 signaling, and/or Layer 3 signaling. For instance, the network node may indicate, via RRC signaling, a value of a ratio between the time-domain density of the first PTRS and the time-domain density of the second PTRS. As another example, the network node may transmit the indication of the MCS threshold (e.g., a value for the MCS threshold) and/or the time-domain density relationship (e.g., a value for the ratio) in a MAC CE.

The first network node 702 and/or the second network node 704 may transmit, as at least part of the cross-PTRS rate matching configuration information, an indication of the relative RE offset based at least in part a mapping to a DMRS port. For instance, the first network node 702 and/or the second network node 704 may indicate a selection of a particular relative RE offset from a mapping table (e.g., an RRC configured mapping table and/or a communication standard-defined mapping table) as described with regard to reference number 730 in any combination of Layer 1 signaling, Layer 2 signaling, and/or Layer 3 signaling. However, in other aspects, the mapping may be indicated by a communication standard such that the RE offset for a second PTRS may be implicit based at least in part on a DMRS port that is associated with a first PTRS (and/or vice versa). Alternatively, or additionally, the first network node 702 and/or the second network node 704 may transmit an indication of a relative RE offset (e.g., a value) in Layer 1 signaling, Layer 2 signaling, and/or Layer 3 signaling.

In some aspects, the first network node 702 and/or the second network node 704 may transmit an indication of the operating mode of the cross-PTRS rate matching, such as the operating mode determined as described with regard to reference number 740 (e.g., based on a UE report) and/or reference number 750 (e.g., identifying an overlapping resource). As one example, the first network node 702 and/or the second network node 704 may transmit an indication of an enabled state and/or a disabled state in DCI and/or a MAC CE. To illustrate, the first network node 702 and/or the second network node 704 may transmit the indication of the cross-PTRS rate matching operating mode in DCI as a per-slot dynamic indication, such as the single bit field as described above. Alternatively, or additionally, the first network node 702 and/or the second network node 704 may transmit the indication of the cross-PTRS rate matching operating mode in a MAC CE that is set and remains valid until transmission of an updated cross-PTRS rate matching operating mode (e.g., a sticky indication whose value remains valid until updated).

As shown by reference number 770-1, the first network node 702 may generate a first PDSCH based at least in part on using cross-PTRS rate matching. Alternatively, or additionally, and as shown by reference number 770-2, the second network node 704 may generate a second PDSCH based at least in part on using cross-PTRS rate matching. To illustrate, the first network node 702 may generate a first PDSCH that includes a first PTRS and first user data based at least in part on performing cross-PTRS rate matching as described with regard to FIG. 6B to avoid one or more overlapping resources assigned to a second PTRS that is associated with the second network node 704. Alternatively, or additionally, the second network node 704 may generate a second PDSCH that includes a second PTRS and second user data based at least in part on performing cross-PTRS rate matching as described with regard to FIG. 6 to avoid one or more overlapping resources assigned to the first PTRS that is associated with the first network node 702. The first network node 702 may derive a resource location of the second PTRS based least in part on the second PTRS configuration information. Alternatively, or additionally, the second network node 704 may derive a location of the first PTRS based at least in part on the first PTRS configuration information. In some aspects, the first network node 702 and/or the second network node 704 may perform cross-PTRS rate matching based at least in part on receiving an indication that the UE 706 includes support for the cross-PTRS rate matching as described above.

As shown by reference number 780, the first network node 702 may transmit, and the UE 706 may receive, a first PTRS and/or first user data based at least in part on the first PDSCH as described with regard to reference number 770-1. Alternatively, or additionally, the second network node 704 may transmit, and UE 706 may receive, a second PTRS and/or second user data based at least in part on the second PDSCH as described with regard to reference number 770-2. That is, the first network node 702 may transmit the first PTRS in the first PDSCH based at least in part on the first PTRS configuration information associated with the first PTRS and cross-PTRS rate matching that is based at least in part on the second PTRS configuration information. Alternatively, or additionally, the second network node 704 may transmit the second PTRS in the second PDSCH based at least in part on the second PTRS configuration information associated with the second PTRS and cross-PTRS rate matching that is based at least in part on the first PTRS configuration information.

As shown by reference number 790, the UE 706 may recover a first PTRS and/or first user data based at least in part on the first PDSCH, cross-PTRS rate matching included in the first PDSCH, and/or a cross-PTRS rate matching operating mode. Alternatively, or additionally, the UE 706 may recover a second PTRS and/or second user data based at least in part on the second PDSCH, cross-PTRS rate matching included in the second PDSCH, and/or the cross-PTRS rate matching operating mode. For example, the UE 706 may recover the first user data from the first PDSCH based at least in part on refraining from using a first resource that lacks user data based on the cross-PTRS rate matching and/or the cross-PTRS rate matching having an enabled state. Alternatively, or additionally, the UE 706 may recover the second user data from the second PDSCH based at least in part on refraining from using a second resource that lacks user data based on the cross-PTRS rate matching and/or the cross-PTRS rate matching having an enabled state. As one example, the UE 706 may identify that a single bit field in DCI indicates that cross-PTRS rate matching has an enabled state and/or that the resources of the first PDSCH and the resource of the second PDSCH are fully overlapping, and may recover the first user data based at least in part on cross-PTRS rate matching being applied to the first PDSCH based at least in part on a resource location of the second PTRS (and/or vice versa for recovering the second user data).

The UE 706 may derive the first location and/or the second location based at least in part on any combination of information as described above, such as the first PTRS configuration information, the second PTRS configuration information, the cross-PTRS rate matching operating mode, a mapping between a DMRS port and a relative RE offset, one or more DCI, and/or one or more DCI fields. To illustrate, a DCI field (e.g., a PTRS field) transmitted by the first network node 702 may indicate a PTRS allocation associated with the second network node 704 (or vice versa), such as a time-domain density and/or an RE offset. In some aspects, for fully overlapping resources, an RB allocation to a PDSCH and/or a PTRS may be same for both the first network node 702 and the second network node 704. Accordingly, a PTRS frequency-domain density for the second PTRS may be implicit and/or the same as a PTRS frequency-domain density for the first PTRS. Alternatively, or additionally, the UE 706 may identify that an RRC configured RE offset for a PTRS may be common and/or the same for both the first network node 702 and the second network node 704. In some aspects, the UE 706 may derive a time-domain density associated with the second PTRS based at least in part on an MCS threshold configuration and/or MAC CE signaling.

The UE 706 may derive a resource location of the second PTRS based at least in part on a relative RE offset. As one example, the UE 706 may identify a DMRS port associated with the first PTRS, and derive a RE offset for the first PTRS based at least in part on the DMRS port. In some aspects, the UE 706 may receive an indication of a relative RE offset associated with the second PTRS, such as via a selection of an entry in a mapping table (e.g., RRC configured and/or specified by a communication standard), a DCI configured value, and/or an RRC configured value, and derive the resource location of the second PTRS based at least in part on applying the relative RE offset (e.g., adding or subtracting) to the RE offset associated with the first PTRS. Accordingly, the UE 706 may recover user data based at least in part on determining one or more resources (e.g., resource location(s) of PTRSs) that are associated with cross-PTRS rate matching.

Performing cross-PTRS rate matching may enable a network node (e.g., the first network node 702 and/or the second network node 704) that is transmitting in a coordinated manner with another network node to avoid occupying overlapping resources that are assigned to a PTRS and, subsequently, mitigate distortion to the PTRS (e.g., as observed by a UE). Mitigating distortion to a PTRS may reduce phase tracking errors at a device (e.g., the UE), reduce data recovery errors, increase data throughput, and/or reduce data transfer latencies.

As indicated above, FIG. 7 is provided as an example. Other examples may differ from what is described with regard to FIG. 7.

FIG. 8 is a diagram illustrating an example process 800 performed, for example, by a first network node, in accordance with the present disclosure. Example process 800 is an example where the first network node (e.g., first network node 110) performs operations associated with cross-PTRS rate matching for multiple coordinated TRPs with multiple DCI.

As shown in FIG. 8, in some aspects, process 800 may include receiving second PTRS configuration information for a second PTRS that is associated with a second network node (block 810). For example, the first network node (e.g., using reception component 1002 and/or communication manager 1006, depicted in FIG. 10) may receive second PTRS configuration information for a second PTRS that is associated with a second network node, as described above.

As further shown in FIG. 8, in some aspects, process 800 may include transmitting a PDSCH that includes a first PTRS that is based at least in part on first PTRS configuration information, the PDSCH being based at least in part on cross-PTRS rate matching and the second PTRS configuration information (block 820). For example, the first network node (e.g., using transmission component 1004 and/or communication manager 1006, depicted in FIG. 10) may transmit a PDSCH that includes a first PTRS that is based at least in part on first PTRS configuration information, the PDSCH being based at least in part on cross-PTRS rate matching and the second PTRS configuration information, as described above.

Process 800 may include additional aspects, such as any single aspect or any combination of aspects described below and/or in connection with one or more other processes described elsewhere herein.

In a first aspect, the cross-PTRS rate matching includes performing PDSCH rate matching based at least in part on a resource location of the second PTRS.

In a second aspect, process 800 includes deriving the resource location of the second PTRS based at least in part on the second PTRS configuration information.

In a third aspect, the second PTRS configuration information indicates at least one of a resource element offset within a resource block, a demodulation reference signal port, a time-domain density, a modulation and coding scheme, a frequency-domain density, or a resource block allocation.

In a fourth aspect, process 800 includes transmitting an indication of the first PTRS configuration information to the second network node.

In a fifth aspect, receiving the second PTRS configuration information includes receiving the second PTRS configuration information via a backhaul connection.

In a sixth aspect, process 800 includes transmitting, in a downlink transmission, an indication of the second PTRS configuration information.

In a seventh aspect, transmitting the indication of the second PTRS configuration information includes transmitting the indication in DCI.

In an eighth aspect, the DCI includes a single bit field associated with a cross-PTRS rate matching operating mode, and transmitting the indication includes setting the single bit field to a value that indicates that the cross-PTRS rate matching operating mode has an enabled state.

In a ninth aspect, process 800 includes calculating, based at least in part on the first PTRS configuration information and the second PTRS configuration information, that a first resource associated with the first PTRS overlaps with a second resource associated with the second PTRS, and setting the single bit field to the value that indicates the enabled state is based at least in part on the calculating.

In a tenth aspect, the PDSCH is a first PDSCH, the first resource associated with the first PTRS is based at least in part on the first PDSCH, and the second resource associated with the second PTRS is based at least in part on a second PDSCH that is associated with the second network node.

In an eleventh aspect, the first resource and the second resource are fully overlapping.

In a twelfth aspect, the DCI includes a PTRS resource field associated with the second PTRS, and process 800 includes indicating at least part of the second PTRS configuration information in the PTRS resource field.

In a thirteenth aspect, indicating at least part of the second PTRS configuration information in the PTRS resource field includes indicating, in the PTRS resource field, at least one of a time-domain density associated with the second PTRS, or a resource element offset.

In a fourteenth aspect, the PTRS resource field indicates the time-domain density, and indicating at least part of the second PTRS configuration information in the PTRS resource field includes indicating the time-domain density in the PTRS resource field based at least in part on at least one of an MCS threshold, or a time-domain density relationship with the first PTRS In a fifteenth aspect, the indication of the second PTRS configuration information is a first indication, and process 800 includes transmitting a second indication of at least one of the MCS threshold or a configuration of the time-domain density relationship with the first PTRS.

In a sixteenth aspect, the PTRS resource field indicates the resource element offset, the first PTRS is associated with a DMRS port, and indicating at least part of the second PTRS configuration information in the PTRS resource field includes indicating, as the resource element offset, a relative resource element offset that is based at least in part on a nominal resource element offset associated with the DMRS port.

In a seventeenth aspect, process 800 includes deriving the relative resource element offset based at least in part on a mapping between the DMRS port and the relative resource element offset.

In an eighteenth aspect, the mapping is based at least in part on a mapping table that indicates one or more potential relative resource element offsets for the DMRS port, and deriving the relative resource element offset includes selecting, based at least in part on the mapping, a potential relative resource element of the one or more potential relative resource element offsets as the relative resource element offset.

In a nineteenth aspect, the deriving is based at least in part on the PTRS resource field indicating a selection of an entry in the mapping table (e.g., a mapping table that includes multiple potential relative resource elements offsets for a particular DMRS port).

In a twentieth aspect, the mapping is indicated by a communication standard.

In a twenty-first aspect, the mapping is RRC configured.

In a twenty-second aspect, process 800 includes transmitting an indication of a relative resource element offset associated with the second PTRS that is based at least in part on the first PTRS.

In a twenty-third aspect, transmitting the indication includes transmitting the indication in at least one of downlink control information, or radio resource control signaling.

In a twenty-fourth aspect, process 800 includes receiving a UE report that indicates a cross-PTRS operating condition associated with a UE, and setting an operating mode of the cross-PTRS rate matching based at least in part on the cross-PTRS operating condition.

In a twenty-fifth aspect, the UE report indicates, as the cross-PTRS operating condition, at least one of a correlation metric associated with the first network node and the second network node, a PDSCH transmission rank, or a modulation and coding scheme, or a UE-selected cross-PTRS rate matching operating mode.

In a twenty-sixth aspect, process 800 includes calculating that the cross-PTRS operating condition satisfies a cross-PTRS rate matching threshold, and selecting, as the operating mode, an enabled state.

In a twenty-seventh aspect, process 800 includes calculating that the cross-PTRS operating condition fails to satisfy a cross-PTRS rate matching threshold, and selecting, as the operating mode, a disabled state.

In a twenty-eighth aspect, receiving the UE report includes receiving the UE report in at least one of a channel state information report, or a layer 1 reference signal received power report.

In a twenty-ninth aspect, process 800 includes transmitting an indication of the operating mode of the cross-PTRS rate matching.

In a thirtieth aspect, transmitting the indication of the operating mode includes transmitting the indication in at least one of downlink control information, or a MAC CE.

In a thirty-first aspect, process 800 includes receiving a UE report that indicates a UE-selected cross-PTRS rate matching operating mode.

In a thirty-second aspect, process 800 includes receiving an indication that a UE supports the cross-PTRS rate matching, transmitting the first PTRS based at least in part on the first PTRS configuration information and the cross-PTRS rate matching is based at least in part on receiving the indication.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a UE, in accordance with the present disclosure. Example process 900 is an example where the UE (e.g., UE 120) performs operations associated with cross-PTRS rate matching for multiple coordinated TRPs with multiple DCI.

As shown in FIG. 9, in some aspects, process 900 may include receiving a first indication of first PTRS configuration information for a first PTRS that is associated with a first PDSCH transmitted by a first network node (block 910). For example, the UE (e.g., using reception component 1102 and/or communication manager 1106, depicted in FIG. 11) may receive a first indication of first PTRS configuration information for a first PTRS that is associated with a first PDSCH transmitted by a first network node, as described above.

As further shown in FIG. 9, in some aspects, process 900 may include receiving a second indication of second PTRS configuration information for a second PTRS that is associated with a second PDSCH that is transmitted by a second network node (block 920). For example, the UE (e.g., using reception component 1102 and/or communication manager 1106, depicted in FIG. 11) may receive a second indication of second PTRS configuration information for a second PTRS that is associated with a second PDSCH that is transmitted by a second network node, as described above.

As further shown in FIG. 9, in some aspects, process 900 may include recovering the first PTRS and the second PTRS based at least in part on the first PTRS configuration information, the second PTRS configuration information, and a cross-PTRS rate matching operating mode (block 930). For example, the UE (e.g., using communication manager 1106, depicted in FIG. 11) may recover the first PTRS and the second PTRS based at least in part on the first PTRS configuration information, the second PTRS configuration information, and a cross-PTRS rate matching operating mode, as described above.

Process 900 may include additional aspects, such as any single aspect or any combination of aspects described below and/or in connection with one or more other processes described elsewhere herein.

In a first aspect, the cross-PTRS rate matching operating mode is enabled, and process 900 includes recovering the first PTRS from the first PDSCH based at least in part on first PDSCH rate matching that is based at least in part on a second resource location of the second PTRS in the second PDSCH, and recovering the second PTRS from the second PDSCH based at least in part on second PDSCH rate matching that is based at least in part on a first resource location of the first PTRS in the first PDSCH.

In a second aspect, one or more resources of the first PDSCH are overlapping with one or more resources of the second PDSCH.

In a third aspect, process 900 includes receiving first DCI from the first network node that indicates the first PTRS configuration information for the first PTRS, and receiving second DCI from the second network node that indicates the second PTRS configuration information for the second PTRS.

In a fourth aspect, process 900 includes receiving, in a downlink transmission and from the first network node, an indication of the second PTRS configuration information for the second PTRS that is associated with the second network node.

In a fifth aspect, the downlink transmission includes DCI.

In a sixth aspect, the DCI includes a single bit field associated with a cross-PTRS rate matching operating mode, and the single bit field is set to a value that indicates that the cross-PTRS rate matching has an enabled state.

In a seventh aspect, the DCI includes a PTRS resource field associated with the second PTRS, and the PTRS resource field indicates at least part of the second PTRS configuration information in the PTRS resource field.

In an eighth aspect, the PTRS resource field indicates at least one of a time-domain density associated with the second PTRS, or a resource element offset.

In a ninth aspect, the PTRS resource field indicates the time-domain density based least in part on an MCS threshold.

In a tenth aspect, the indication of the second PTRS configuration information is a first indication, and process 900 includes receiving a second indication of the MCS threshold.

In an eleventh aspect, the PTRS resource field indicates the resource element offset, the first PTRS is associated with a DMRS port, and the PTRS resource field indicates, as the resource element offset, a relative resource element offset that is based at least in part on a nominal resource element offset associated with the DMRS port.

In a twelfth aspect, the PTRS resource field indicates the relative resource element offset based at least in part on a mapping between the DMRS port and the relative resource element offset.

In a thirteenth aspect, the mapping is based at least in part on a mapping table that indicates one or more potential relative resource element offsets for the DMRS port.

In a fourteenth aspect, the PTRS resource field indicates a selection of an entry in the mapping table (e.g., for a mapping table that includes multiple potential relative resource elements offsets for a particular DMRS port).

In a fifteenth aspect, the mapping is indicated by a communication standard.

In a sixteenth aspect, the mapping is RRC configured.

In a seventeenth aspect, process 900 includes receiving an indication of a relative resource element offset associated with the second PTRS that is based at least in part on the first PTRS.

In an eighteenth aspect, receiving the indication includes receiving the indication in at least one of downlink control information, or radio resource control signaling.

In a nineteenth aspect, process 900 includes transmitting a UE report that indicates a cross-PTRS operating condition.

In a twentieth aspect, the UE report indicates, as the cross-PTRS operating condition, at least one of a correlation metric associated with the first network node and the second network node, a PDSCH transmission rank, or a modulation and coding scheme.

In a twenty-first aspect, transmitting the UE report includes transmitting the UE report in at least one of a channel state information report, or a layer 1 reference signal received power report.

In a twenty-second aspect, process 900 includes receiving an indication of a cross-PTRS rate matching operating mode.

In a twenty-third aspect, receiving the indication of the cross-PTRS rate matching operating mode includes receiving the indication in at least one of downlink control information, or a MAC CE.

In a twenty-fourth aspect, process 900 includes transmitting a UE report that indicates a UE-selected cross-PTRS rate matching operating mode.

In a twenty-fifth aspect, process 900 includes transmitting an indication of support for the cross-PTRS rate matching.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
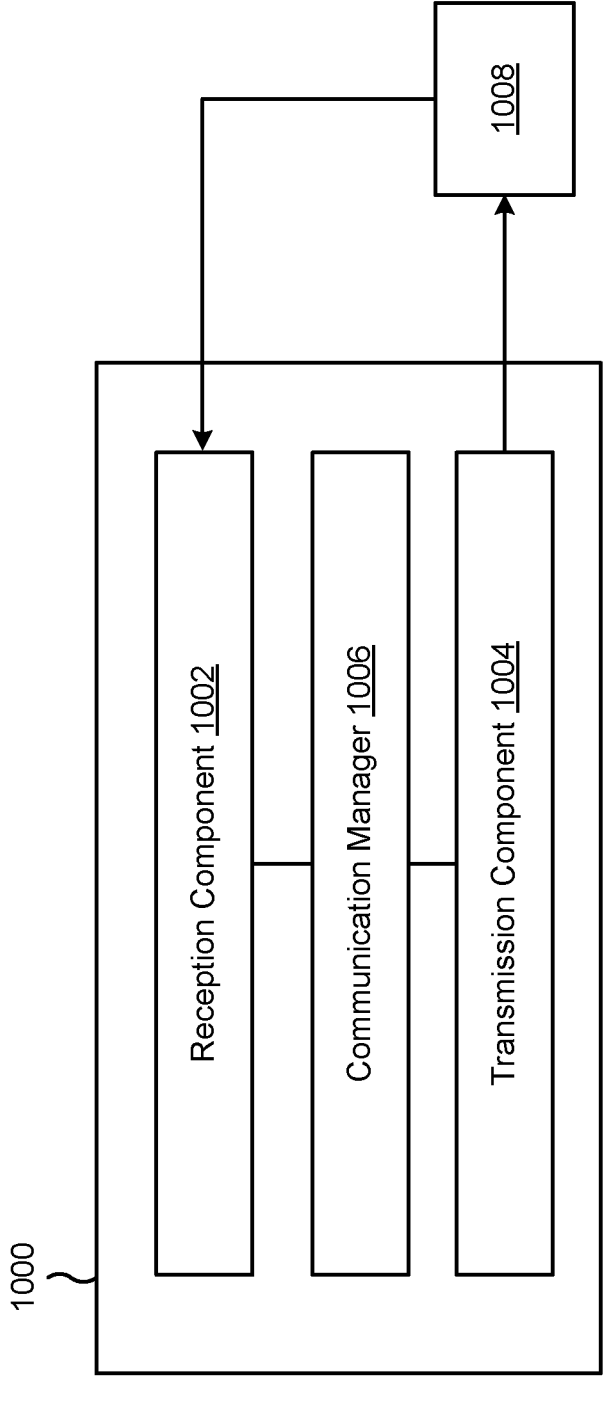
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 150 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 5-9. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2. In some aspects, the reception component 1002 and/or the transmission component 1004 may include or may be included in a network interface. The network interface may be configured to obtain and/or output signals for the apparatus 1000 via one or more communications links, such as a backhaul link, a midhaul link, and/or a fronthaul link.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The communication manager 1006 may receive, by way of the reception component 1002, second PTRS configuration information for a second PTRS that is associated with a second network node. The transmission component 1004 may transmit a PDSCH that includes a first PTRS that is based at least in part on first PTRS configuration information, the PDSCH being based at least in part on cross-PTRS rate matching and the second PTRS configuration information.

The communication manager 1006 may derive the resource location of the second PTRS based at least in part on the second PTRS configuration information. In some aspects, the communication manager 1006 may transmit, by way of the transmission component 1004, an indication of the first PTRS configuration information to the second network node. The communication manager 1006 may transmit, by way of the transmission component 1004 an in a downlink transmission, an indication of the second PTRS configuration information.

The communication manager 1006 may calculate, based at least in part on the first PTRS configuration information and the second PTRS configuration information, that a first resource associated with the first PTRS overlaps with a second resource associated with the second PTRS and set the single bit field to the value that indicates the enabled state is based at least in part on the calculating. In some aspects, the communication manager 1006 may derive a relative resource element offset based at least in part on a mapping between the DMRS port and the relative resource element offset. Alternatively, or additionally, the communication manager 1006 may transmit, by way of the transmission component 1004, an indication of a relative resource element offset associated with the second PTRS that is based at least in part on the first PTRS.

The communication manager 1006 may receive, by way of the reception component 1002, a UE report that indicates a cross-PTRS operating condition associated with a UE. In some aspects, the communication manager 1006 may set an operating mode of the cross-PTRS rate matching based at least in part on the cross-PTRS operating condition. The communication manager 1006 may calculate that the cross-PTRS operating condition satisfies a cross-PTRS rate matching threshold, and/or the communication manager 1006 may select, as the operating mode, an enabled state. Alternatively, or additionally, the communication manager 1006 may calculate that the cross-PTRS operating condition fails to satisfy a cross-PTRS rate matching threshold, and/or the communication manager 1006 may select, as the operating mode, a disabled state. The communication manager 1006 may transmit, by way of the transmission component 1004, an indication of the operating mode of the cross-PTRS rate matching. In some aspects, the communication manager 1006 may receive, by way of the reception component 1002, a UE report that indicates a UE-selected cross-PTRS rate matching operating mode.

The communication manager 1006 may receive, by way of the reception component 1002, an indication that a UE supports the cross-PTRS rate matching, and the communication manager 1006 may transmit, by way of the transmission component 1004, the first PTRS based at least in part on the first PTRS configuration information and the cross-PTRS rate matching, based at least in part on receiving the indication.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
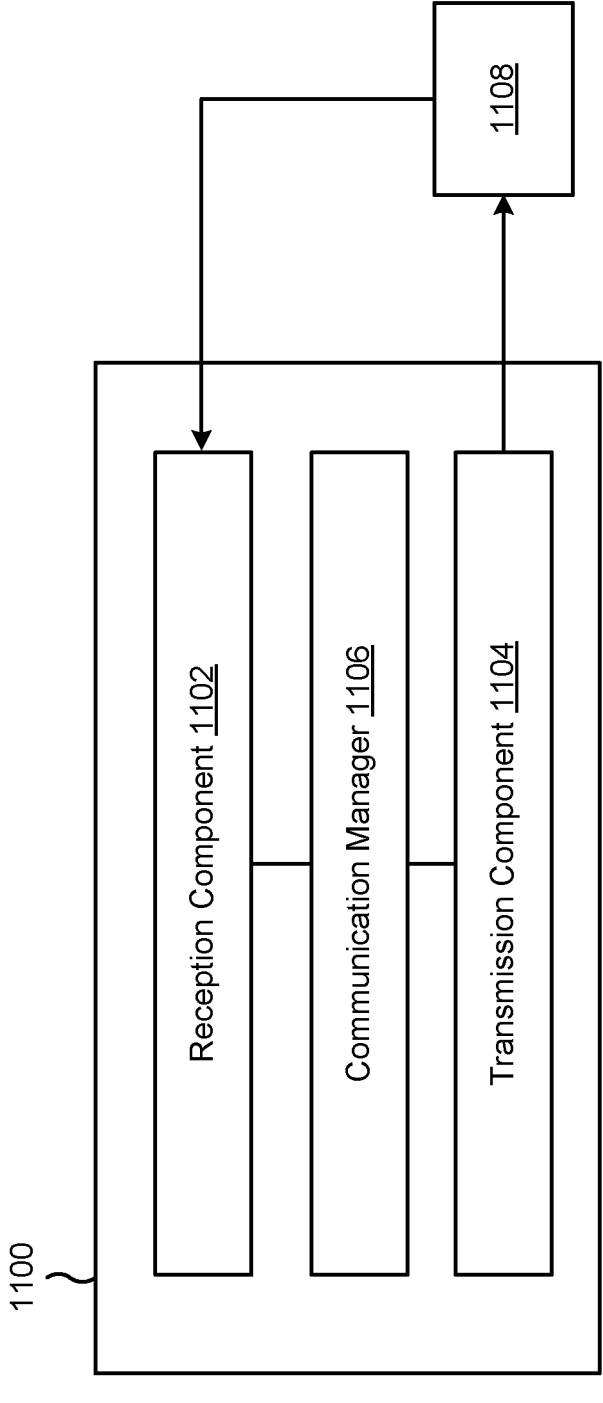
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 140 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 5-9. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The communication manager 1106 may receive, by way of the reception component 1102, a first indication of first PTRS configuration information for a first PTRS that is associated with a first PDSCH transmitted by a first network node. The communication manager 1106 may receive, by way of the reception component 1102, a second indication of second PTRS configuration information for a second PTRS that is associated with a second PDSCH that is transmitted by a second network node. The communication manager 1106 may recover the first PTRS and the second PTRS based at least in part on the first PTRS configuration information, the second PTRS configuration information, and a cross-PTRS rate matching operating mode.

The communication manager 1106 may receive, by way of the reception component 1102, first DCI from the first network node that indicates the first PTRS configuration information for the first PTRS. Alternatively, or additionally, the communication manager 1106 may receive, by way of the reception component 1102, second DCI from the second network node that indicates the second PTRS configuration information for the second PTRS. In some aspects, the communication manager 1106 may receive, by way of the reception component 1102 and in a downlink transmission from the first network node, an indication of the second PTRS configuration information for the second PTRS that is associated with the second network node. Alternatively, or additionally, the communication manager 1106 may receive, by way of the reception component 1102, an indication of a relative resource element offset associated with the second PTRS that is based at least in part on the first PTRS.

The communication manager 1106 may transmit, by way of the transmission component 1104, a UE report that indicates a cross-PTRS operating condition. In some aspects, the communication manager 1106 may receive, by way of the reception component 1102, an indication of a cross-PTRS rate matching operating mode. Alternatively, or additionally, the communication manager 1106 may transmit, by way of the transmission component 1104, a UE report that indicates a UE-selected cross-PTRS rate matching operating mode. In some aspects, the communication manager 1106 may transmit, by way of the transmission component 1104, an indication of support for the cross-PTRS rate matching.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a first network node, comprising: receiving second phase tracking reference signal (PTRS) configuration information for a second PTRS that is associated with a second network node; and transmitting a physical downlink shared channel (PDSCH) that includes a first PTRS that is based at least in part on first PTRS configuration information, the PDSCH being based at least in part on cross-PTRS rate matching and the second PTRS configuration information.

Aspect 2: The method of Aspect 1, wherein the cross-PTRS rate matching comprises performing PDSCH rate matching based at least in part on a resource location of the second PTRS.

Aspect 3: The method of Aspect 2, further comprising: deriving the resource location of the second PTRS based at least in part on the second PTRS configuration information.

Aspect 4: The method of Aspect 3, wherein the second PTRS configuration information indicates at least one of: a resource element offset within a resource block, a demodulation reference signal port, a time-domain density, a modulation and coding scheme, a frequency-domain density, or a resource block allocation.

Aspect 5: The method of any of Aspects 1-4, further comprising: transmitting an indication of the first PTRS configuration information to the second network node.

Aspect 6: The method of any of Aspects 1-5, wherein receiving the second PTRS configuration information comprises: receiving the second PTRS configuration information via a backhaul connection.

Aspect 7: The method of any of Aspects 1-6, further comprising: transmitting, in a downlink transmission, an indication of the second PTRS configuration information.

Aspect 8: The method of Aspect 7, wherein transmitting the indication of the second PTRS configuration information comprises: transmitting the indication in downlink control information (DCI).

Aspect 9: The method of Aspect 8, wherein the DCI includes a single bit field associated with a cross-PTRS rate matching operating mode, and wherein transmitting the indication comprises: setting the single bit field to a value that indicates that the cross-PTRS rate matching operating mode has an enabled state.

Aspect 10: The method of Aspect 9, further comprising: calculating, based at least in part on the first PTRS configuration information and the second PTRS configuration information, that a first resource associated with the first PTRS overlaps with a second resource associated with the second PTRS, wherein setting the single bit field to the value that indicates the enabled state is based at least in part on the calculating.

Aspect 11: The method of Aspect 10, wherein the PDSCH is a first PDSCH, wherein the first resource associated with the first PTRS is based at least in part on the first PDSCH, and wherein the second resource associated with the second PTRS is based at least in part on a second PDSCH that is associated with the second network node.

Aspect 12: The method of Aspect 10, wherein the first resource and the second resource are fully overlapping.

Aspect 13: The method of Aspect 8, wherein the DCI comprises a PTRS resource field associated with the second PTRS, and wherein the method comprises: indicating at least part of the second PTRS configuration information in the PTRS resource field.

Aspect 14: The method of Aspect 13, wherein indicating at least part of the second PTRS configuration information in the PTRS resource field comprises: indicating, in the PTRS resource field, at least one of: a time-domain density associated with the second PTRS, or a resource element offset.

Aspect 15: The method of Aspect 14, wherein the PTRS resource field indicates the time-domain density, and wherein indicating at least part of the second PTRS configuration information in the PTRS resource field comprises: indicating the time-domain density in the PTRS resource field based at least in part on at least one of: a modulation and coding scheme (MCS) threshold, or a time-domain density relationship with the first PTRS Aspect 16: The method of Aspect 15, wherein the indication of the second PTRS configuration information is a first indication, and the method further comprises: transmitting, in a medium access control (MAC) control element (CE), a second indication of at least one of: the MCS threshold or a configuration of the time-domain density relationship with the first PTRS.

Aspect 17: The method of Aspect 14, wherein the PTRS resource field indicates the resource element offset, wherein the first PTRS is associated with a demodulation reference signal (DMRS) port, and wherein indicating at least part of the second PTRS configuration information in the PTRS resource field comprises: indicating, as the resource element offset, a relative resource element offset that is based at least in part on a nominal resource element offset associated with the DMRS port.

Aspect 18: The method of Aspect 17, further comprising: deriving the relative resource element offset based at least in part on a mapping between the DMRS port and the relative resource element offset.

Aspect 19: The method of Aspect 18, wherein the mapping is based at least in part on a mapping table that indicates one or more potential relative resource element offsets for the DMRS port, and wherein deriving the relative resource element offset comprises: selecting, based at least in part on the mapping, a potential relative resource element of the one or more potential relative resource element offsets as the relative resource element offset.

Aspect 20: The method of Aspect 19, wherein the PTRS resource field indicates a selection of an entry in the mapping table.

Aspect 21: The method of Aspect 19 or Aspect 20, wherein the mapping is indicated by a communication standard.

Aspect 22: The method of Aspect 19 or Aspect 20, wherein the mapping is radio resource control (RRC) configured.

Aspect 23: The method of any of Aspects 1-22, further comprising: transmitting an indication of a relative resource element offset associated with the second PTRS that is based at least in part on the first PTRS.

Aspect 24: The method of Aspect 23, wherein transmitting the indication comprises: transmitting the indication in at least one of: downlink control information, or radio resource control signaling.

Aspect 25: The method of any of Aspects 1-24, further comprising: receiving a user equipment (UE) report that indicates a cross-PTRS operating condition associated with a UE; and setting an operating mode of the cross-PTRS rate matching based at least in part on the cross-PTRS operating condition.

Aspect 26: The method of Aspect 25, wherein the UE report indicates, as the cross-PTRS operating condition, at least one of: a correlation metric associated with the first network node and the second network node, a PDSCH transmission rank, or a modulation and coding scheme, or a UE-selected cross-PTRS rate matching operating mode.

Aspect 27: The method of Aspect 25, further comprising: calculating that the cross-PTRS operating condition satisfies a cross-PTRS rate matching threshold; and selecting, as the operating mode, an enabled state.

Aspect 28: The method of Aspect 25, further comprising: calculating that the cross-PTRS operating condition fails to satisfy a cross-PTRS rate matching threshold; and selecting, as the operating mode, a disabled state.

Aspect 29: The method of Aspect 25, wherein receiving the UE report comprises: receiving the UE report in at least one of: a channel state information report, or a layer 1 reference signal received power report.

Aspect 30: The method of Aspect 25, further comprising: transmitting an indication of the operating mode of the cross-PTRS rate matching.

Aspect 31: The method of Aspect 30, wherein transmitting the indication of the operating mode comprises: transmitting the indication in at least one of: downlink control information, or a medium access control (MAC) control element (CE).

Aspect 32: The method of any of Aspects 1-31, further comprising: receiving a user equipment (UE) report that indicates a UE-selected cross-PTRS rate matching operating mode.

Aspect 33: The method of any of Aspects 1-32, further comprising: receiving an indication that a user equipment (UE) supports the cross-PTRS rate matching, wherein transmitting the first PTRS based at least in part on the first PTRS configuration information and the cross-PTRS rate matching is based at least in part on receiving the indication.

Aspect 34: A method of wireless communication performed by a user equipment (UE), comprising: receiving a first indication of first phase tracking reference signal (PTRS) configuration information for a first PTRS that is associated with a first physical downlink shared channel (PDSCH) transmitted by a first network node; receiving a second indication of second PTRS configuration information for a second PTRS that is associated with a second PDSCH that is transmitted by a second network node; and recovering the first PTRS and the second PTRS based at least in part on the first PTRS configuration information, the second PTRS configuration information, and a cross-PTRS rate matching operating mode.

Aspect 35: The method of Aspect 34, wherein the cross-PTRS rate matching operating mode is enabled, and the method comprises: recovering the first PTRS from the first PDSCH based at least in part on first PDSCH rate matching that is based at least in part on a second resource location of the second PTRS in the second PDSCH; and recovering the second PTRS from the second PDSCH based at least in part on second PDSCH rate matching that is based at least in part on a first resource location of the first PTRS in the first PDSCH.

Aspect 36: The method of Aspect 35, wherein one or more resources of the first PDSCH are overlapping with one or more resources of the second PDSCH.

Aspect 37: The method of any of Aspects 34-36, further comprising: receiving first downlink control information (DCI) from the first network node that indicates the first PTRS configuration information for the first PTRS; and receiving second DCI from the second network node that indicates the second PTRS configuration information for the second PTRS.

Aspect 38: The method of any of Aspects 34-37, further comprising: receiving, in a downlink transmission and from the first network node, an indication of the second PTRS configuration information for the second PTRS that is associated with the second network node.

Aspect 39: The method of Aspect 38, wherein the downlink transmission comprises downlink control information (DCI).

Aspect 40: The method of Aspect 39, wherein the DCI includes a single bit field associated with a cross-PTRS rate matching operating mode, and wherein the single bit field is set to a value that indicates that the cross-PTRS rate matching has an enabled state.

Aspect 41: The method of Aspect 39, wherein the DCI comprises a PTRS resource field associated with the second PTRS, and wherein the PTRS resource field indicates at least part of the second PTRS configuration information in the PTRS resource field.

Aspect 42: The method of Aspect 41, wherein the PTRS resource field indicates at least one of: a time-domain density associated with the second PTRS, or a resource element offset.

Aspect 43: The method of Aspect 42, wherein the PTRS resource field indicates the time-domain density based least in part on a modulation and coding scheme (MCS) threshold.

Aspect 44: The method of Aspect 43, wherein the indication of the second PTRS configuration information is a first indication, and the method further comprises: receiving a second indication of the MCS threshold.

Aspect 45: The method of Aspect 42, wherein the PTRS resource field indicates the resource element offset, wherein the first PTRS is associated with a demodulation reference signal (DMRS) port, and wherein the PTRS resource field indicates, as the resource element offset, a relative resource element offset that is based at least in part on a nominal resource element offset associated with the DMRS port.

Aspect 46: The method of Aspect 45, wherein the PTRS resource field indicates the relative resource element offset based at least in part on a mapping between the DMRS port and the relative resource element offset.

Aspect 47: The method of Aspect 46, wherein the mapping is based at least in part on a mapping table that indicates one or more potential relative resource element offsets for the DMRS port Aspect 48: The method of Aspect 47, wherein the PTRS resource field indicates a selection of an entry in the mapping table.

Aspect 49: The method of Aspect 47 or Aspect 48, wherein the mapping is indicated by a communication standard.

Aspect 50: The method of Aspect 47 or Aspect 48, wherein the mapping is radio resource control (RRC) configured.

Aspect 51: The method of any of Aspects 34-50, further comprising: receiving an indication of a relative resource element offset associated with the second PTRS that is based at least in part on the first PTRS.

Aspect 52: The method of Aspect 51, wherein receiving the indication comprises: receiving the indication in at least one of: downlink control information, or radio resource control signaling.

Aspect 53: The method of any of Aspects 34-52, further comprising: transmitting a UE report that indicates a cross-PTRS operating condition.

Aspect 54: The method of Aspect 53, wherein the UE report indicates, as the cross-PTRS operating condition, at least one of: a correlation metric associated with the first network node and the second network node, a physical downlink shared channel (PDSCH) transmission rank, or a modulation and coding scheme.

Aspect 55: The method of Aspect 54, wherein transmitting the UE report comprises: transmitting the UE report in at least one of: a channel state information report, or a layer 1 reference signal received power report.

Aspect 56: The method of Aspect 53, further comprising: receiving an indication of a cross-PTRS rate matching operating mode.

Aspect 57: The method of Aspect 56, wherein receiving the indication of the cross-PTRS rate matching operating mode comprises: receiving the indication in at least one of:

downlink control information, or a medium access control (MAC) control element (CE).

Aspect 58: The method of any of Aspects 34-57, further comprising: transmitting a UE report that indicates a UE-selected cross-PTRS rate matching operating mode.

Aspect 59: The method of any of Aspects 34-58, further comprising: transmitting an indication of support for the cross-PTRS rate matching.

Aspect 60: An apparatus for wireless communication at a device, comprising a processor; memory coupled with the processor; and instructions stored in the memory and executable by the processor to cause the apparatus to perform the method of one or more of Aspects 1-33.

Aspect 61: An apparatus for wireless communication at a device, comprising a processor; memory coupled with the processor; and instructions stored in the memory and executable by the processor to cause the apparatus to perform the method of one or more of Aspects 34-59.

Aspect 62: A device for wireless communication, comprising a memory and one or more processors coupled to the memory, the one or more processors configured to perform the method of one or more of Aspects 1-33.

Aspect 63: A device for wireless communication, comprising a memory and one or more processors coupled to the memory, the one or more processors configured to perform the method of one or more of Aspects 34-59.

Aspect 64: An apparatus for wireless communication, comprising at least one means for performing the method of one or more of Aspects 1-33.

Aspect 65: An apparatus for wireless communication, comprising at least one means for performing the method of one or more of Aspects 34-59.

Aspect 66: A non-transitory computer-readable medium storing code for wireless communication, the code comprising instructions executable by a processor to perform the method of one or more of Aspects 1-33.

Aspect 67: A non-transitory computer-readable medium storing code for wireless communication, the code comprising instructions executable by a processor to perform the method of one or more of Aspects 34-59.

Aspect 68: A non-transitory computer-readable medium storing a set of instructions for wireless communication, the set of instructions comprising one or more instructions that, when executed by one or more processors of a device, cause the device to perform the method of one or more of Aspects 1-33.

Aspect 69: A non-transitory computer-readable medium storing a set of instructions for wireless communication, the set of instructions comprising one or more instructions that, when executed by one or more processors of a device, cause the device to perform the method of one or more of Aspects 34-59.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:
1. An apparatus for wireless communication at a first network node, comprising:
one or more memories; and
one or more processors, coupled to the one or more memories, configured to:
receive second phase tracking reference signal (PTRS) configuration information for a second PTRS that is associated with a second network node;
transmit a physical downlink shared channel (PDSCH) that includes a first PTRS that is based at least in part on first PTRS configuration information, the PDSCH being based at least in part on cross-PTRS rate matching and the second PTRS configuration information; and
transmit, in a downlink control information (DCI) transmission, an indication of the second PTRS configuration information, wherein a value associated with the DCI transmission indicates that a cross-PTRS rate matching mode is enabled, and wherein the DCI transmission includes a single bit field that indicates the value.
2. The apparatus of claim 1, wherein the one or more processors are further configured to:
perform PDSCH rate matching based at least in part on a resource location of the second PTRS.
3. The apparatus of claim 2, wherein the one or more processors are further configured to:
derive the resource location of the second PTRS based at least in part on the second PTRS configuration information.
4. The apparatus of claim 1, wherein the one or more processors are further configured to:
transmit an indication of the first PTRS configuration information to the second network node.
5. The apparatus of claim 1, wherein the DCI transmission comprises a PTRS resource field associated with the second PTRS.
6. The apparatus of claim 5, wherein the one or more processors are configured to:
indicate at least part of the second PTRS configuration information in the PTRS resource field.
7. The apparatus of claim 1, wherein the one or more processors, to transmit the indication, are configured to:
set the single bit field to the value, wherein the value indicates that the cross-PTRS rate matching operating mode is enabled.
8. The apparatus of claim 5, wherein the PTRS resource field indicates a time-domain density associated with the second PTRS.
9. The apparatus of claim 8,
wherein the one or more processors, to indicate at least part of second PTRS configuration information in the PTRS resource field, are configured to:
indicate the time-domain density in the PTRS resource field based at least in part on at least one of:
a modulation and coding scheme (MCS) threshold, or
a time-domain density relationship with the first PTRS.
10. The apparatus of claim 9, wherein the PTRS resource field indicates a resource element offset,
wherein the first PTRS is associated with a demodulation reference signal (DMRS) port, and
wherein the one or more processors, to indicate at least part of the second PTRS configuration information in the PTRS resource field, are configured to:
indicate, as the resource element offset, a relative resource element offset that is based at least in part on a nominal resource element offset associated with the DMRS port.
11. The apparatus of claim 1, wherein the one or more processors are further configured to:
transmit an indication of a relative resource element offset associated with the second PTRS that is based at least in part on the first PTRS.
12. The apparatus of claim 1, wherein the one or more processors are further configured to:

receive a user equipment (UE) report that indicates a cross-PTRS operating condition associated with a UE; and set an operating mode of the cross-PTRS rate matching based at least in part on the cross-PTRS operating condition.

13. The apparatus of claim 12, wherein the UE report indicates, as the cross-PTRS operating condition, at least one of:

a correlation metric associated with the first network node and the second network node, a PDSCH transmission rank, or a modulation and coding scheme, or the cross-PTRS rate matching mode, wherein the cross-PTRS rate matching mode is UE-selected.

14. An apparatus for wireless communication at a user equipment (UE), comprising:

one or more memories; and one or more processors, coupled to the one or more memories, configured to:

receive a first indication of first phase tracking reference signal (PTRS) configuration information for a first PTRS that is associated with a first physical downlink shared channel (PDSCH) transmitted by a first network node;

receive, in a downlink control information (DCI) transmission, a second indication of second PTRS configuration information for a second PTRS that is associated with a second PDSCH that is transmitted by a second network node, wherein a value associated with the DCI transmission indicates that a cross-PTRS rate matching operating mode is enabled, and wherein the DCI transmission includes a single bit field that indicates the value; and recover the first PTRS and the second PTRS based at least in part on the first PTRS configuration information, the second PTRS configuration information, and the cross-PTRS rate matching operating mode.

15. The apparatus of claim 14, wherein the one or more processors are further configured to:

recover the first PTRS from the first PDSCH based at least in part on first PDSCH rate matching that is based at least in part on a second resource location of the second PTRS in the second PDSCH; and recover the second PTRS from the second PDSCH based at least in part on second PDSCH rate matching that is based at least in part on a first resource location of the first PTRS in the first PDSCH.

16. The apparatus of claim 14, wherein the one or more processors are further configured to:

receive a second DCI transmission from the first network node that indicates the first PTRS configuration information for the first PTRS; and receive a third DCI transmission from the second network node that indicates the second PTRS configuration information for the second PTRS.

17. The apparatus of claim 14, wherein the one or more processors, to receive the DCI transmission are further configured to:

receive, in the DCI transmission and from the first network node, the second indication of the second PTRS configuration information.

18. The apparatus of claim 14, wherein the DCI transmission comprises a PTRS resource field associated with the second PTRS.

19. The apparatus of claim 18, wherein the the one or more processors are configured to:

indicate at least part of the second PTRS configuration information in the PTRS resource field.

20. The apparatus of claim 14, wherein the DCI comprises a PTRS resource field associated with the second PTRS, and wherein the PTRS resource field indicates at least part of the second PTRS configuration information in the PTRS resource field.

21. The apparatus of claim 20, wherein the PTRS resource field indicates at least one of:

a time-domain density associated with the second PTRS, or a resource element offset.

22. The apparatus of claim 14, wherein the one or more processors are further configured to:

receive an indication of a relative resource element offset associated with the second PTRS that is based at least in part on the first PTRS.

23. The apparatus of claim 14, wherein the one or more processors are further configured to:

transmit a UE report that indicates a cross-PTRS operating condition.

24. The apparatus of claim 23, wherein the UE report indicates, as the cross-PTRS operating condition, at least one of:

a correlation metric associated with the first network node and the second network node, a physical downlink shared channel (PDSCH) transmission rank, a modulation and coding scheme, or the cross-PTRS rate matching operating mode, wherein the cross-PTRS rate matching operating mode is UE-selected.

25. A method of wireless communication performed by a first network node, comprising:

receiving second phase tracking reference signal (PTRS) configuration information for a second PTRS that is associated with a second network node;

transmitting a physical downlink shared channel (PDSCH) that includes a first PTRS that is based at least in part on first PTRS configuration information, the PDSCH being based at least in part on cross-PTRS rate matching and the second PTRS configuration information; and transmitting, in a downlink control information (DCI) transmission, an indication of the second PTRS configuration information, wherein a value associated with the DCI transmission indicates that a cross-PTRS rate matching mode is enabled, and wherein the DCI transmission includes a single bit field that indicates the value.

26. The method of claim 25, wherein the cross-PTRS rate matching comprises:

performing PDSCH rate matching based at least in part on a resource location of the second PTRS.

27. The method of claim 25, wherein the DCI transmission comprises a PTRS resource field associated with the second PTRS.

28. The method of claim 25, further comprising:

transmitting an indication of a relative resource element offset associated with the second PTRS that is based at least in part on the first PTRS.

29. A method of wireless communication performed by a user equipment (UE), comprising:

receiving a first indication of first phase tracking reference signal (PTRS) configuration information for a first PTRS that is associated with a first physical downlink shared channel (PDSCH) transmitted by a first network node;

receiving, in a downlink control information (DCI) transmission, a second indication of second PTRS configuration information for a second PTRS that is associated with a second PDSCH that is transmitted by a second network node, wherein a value associated with the DCI transmission indicates that a cross-PTRS rate matching operating mode is enabled, and wherein the DCI transmission includes a single bit field that indicates the value; and recovering the first PTRS and the second PTRS based at least in part on the first PTRS configuration information, the second PTRS configuration information, and the cross-PTRS rate matching operating mode.

30. The method of claim 29, further comprising:

recovering the first PTRS from the first PDSCH based at least in part on first PDSCH rate matching that is based at least in part on a second resource location of the second PTRS in the second PDSCH; and recovering the second PTRS from the second PDSCH based at least in part on second PDSCH rate matching that is based at least in part on a first resource location of the first PTRS in the first PDSCH.

* * * * *